United States Patent
Tian

(10) Patent No.: US 8,682,087 B2
(45) Date of Patent: Mar. 25, 2014

(54) SYSTEM AND METHOD FOR DEPTH-GUIDED IMAGE FILTERING IN A VIDEO CONFERENCE ENVIRONMENT

(75) Inventor: Dihong Tian, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 92 days.

(21) Appl. No.: 13/329,943

(22) Filed: Dec. 19, 2011

(65) Prior Publication Data

US 2013/0156332 A1    Jun. 20, 2013

(51) Int. Cl.
*G06K 9/36* (2006.01)

(52) U.S. Cl.
USPC ............ 382/232; 382/233; 382/260; 382/154

(58) Field of Classification Search
USPC ................. 382/232, 260, 103, 154, 159, 111; 348/169, 177, E7.085; 345/506
See application file for complete search history.

(56) References Cited

U.S. PATENT DOCUMENTS

| | | | |
|---|---|---|---|
| 2,911,462 A | 11/1959 | Brady | |
| 3,793,489 A | 2/1974 | Sank | 381/92 |
| 3,909,121 A | 9/1975 | De Mesquita Cardoso | |
| 4,400,724 A | 8/1983 | Fields | 348/14.1 |
| 4,473,285 A | 9/1984 | Winter | 396/90 |
| 4,494,144 A | 1/1985 | Brown | |
| 4,750,123 A | 6/1988 | Christian | 701/28 |
| 4,815,132 A | 3/1989 | Minami | |
| 4,827,253 A | 5/1989 | Maltz | 345/640 |
| 4,853,764 A | 8/1989 | Sutter | |
| 4,890,314 A | 12/1989 | Judd et al. | 348/14.01 |
| 4,961,211 A | 10/1990 | Tsugane et al. | |
| 4,994,912 A | 2/1991 | Lumelsky et al. | 348/441 |
| 5,003,532 A | 3/1991 | Ashida et al. | 348/14.9 |
| 5,020,098 A | 5/1991 | Celli | |
| 5,136,652 A | 8/1992 | Jibbe et al. | 704/212 |
| 5,187,571 A | 2/1993 | Braun et al. | |
| 5,200,818 A | 4/1993 | Neta et al. | |
| 5,249,035 A | 9/1993 | Yamanaka | |
| 5,255,211 A | 10/1993 | Redmond | |
| 5,268,734 A | 12/1993 | Parker et al. | 356/139.6 |
| 5,317,405 A | 5/1994 | Kuriki et al. | |

(Continued)

FOREIGN PATENT DOCUMENTS

| | | | |
|---|---|---|---|
| EP | 0 650 299 | 10/1994 | H04N 7/18 |
| EP | 0 714 081 | 11/1995 | G08B 13/196 |

(Continued)

OTHER PUBLICATIONS

U.S. Appl. No. 13/106,002, filed May 12, 2011, entitled "System and Method for Video Coding in a Dynamic Environment," Inventor: Dihong Tian.

(Continued)

*Primary Examiner* — Anh Do
(74) *Attorney, Agent, or Firm* — Patent Capital Group

(57) ABSTRACT

A method is provided in one example embodiment that includes receiving a plurality of depth values corresponding to pixels of an image; and filtering the image as a function of a plurality of variations in the depth values between adjacent pixels of a window associated with the image. In more detailed embodiments, the method may include encoding the image into a bit stream for transmission over a network. The filtering can account for a bit rate associated with the encoding of the image.

20 Claims, 4 Drawing Sheets

(56) References Cited

U.S. PATENT DOCUMENTS

| | | | |
|---|---|---|---|
| 5,337,363 A | 8/1994 | Platt | |
| 5,347,363 A | 9/1994 | Yamanaka | |
| 5,351,067 A | 9/1994 | Lumelsky et al. | 345/561 |
| 5,359,362 A | 10/1994 | Lewis et al. | 348/14.1 |
| 5,406,326 A | 4/1995 | Mowry | |
| 5,423,554 A | 6/1995 | Davis | |
| 5,446,834 A | 8/1995 | Deering | |
| 5,448,287 A | 9/1995 | Hull | |
| 5,467,401 A | 11/1995 | Nagamitsu et al. | |
| 5,495,576 A | 2/1996 | Ritchey | 345/420 |
| 5,502,481 A | 3/1996 | Dentinger et al. | |
| 5,502,726 A | 3/1996 | Fischer | 370/392 |
| 5,506,604 A | 4/1996 | Nally et al. | 345/603 |
| 5,532,737 A | 7/1996 | Braun | |
| 5,541,639 A | 7/1996 | Takatsuki et al. | |
| 5,541,773 A | 7/1996 | Kamo et al. | |
| 5,570,372 A | 10/1996 | Shaffer | 370/468 |
| 5,572,248 A | 11/1996 | Allen et al. | 348/14.16 |
| 5,587,726 A | 12/1996 | Moffat | 345/539 |
| 5,612,733 A | 3/1997 | Flohr | 348/16 |
| 5,625,410 A | 4/1997 | Washino et al. | |
| 5,666,153 A | 9/1997 | Copeland | |
| 5,673,401 A | 9/1997 | Volk et al. | 725/139 |
| 5,675,374 A | 10/1997 | Kohda | |
| 5,715,377 A | 2/1998 | Fukushima et al. | 358/1.9 |
| 5,729,471 A | 3/1998 | Jain et al. | |
| 5,737,011 A | 4/1998 | Lukacs | 348/14.09 |
| 5,748,121 A | 5/1998 | Romriell | |
| 5,760,826 A | 6/1998 | Nayar | |
| 5,790,182 A | 8/1998 | Hilaire | |
| 5,796,724 A | 8/1998 | Rajamani et al. | 370/263 |
| 5,815,196 A | 9/1998 | Alshawi | |
| 5,818,514 A | 10/1998 | Duttweiler et al. | 348/14.1 |
| 5,821,985 A | 10/1998 | Iizawa | 348/14.09 |
| 5,889,499 A | 3/1999 | Nally et al. | 345/7 |
| 5,894,321 A | 4/1999 | Downs et al. | 348/14.9 |
| 5,940,118 A | 8/1999 | Van Schyndel | 348/14.5 |
| 5,940,530 A | 8/1999 | Fukushima et al. | 382/164 |
| 5,953,052 A | 9/1999 | McNelley et al. | 348/14.16 |
| 5,956,100 A | 9/1999 | Gorski | 348/842 |
| 6,069,658 A | 5/2000 | Watanabe | 348/316 |
| 6,088,045 A | 7/2000 | Lumelsky et al. | 345/531 |
| 6,097,441 A | 8/2000 | Allport | 348/552 |
| 6,101,113 A | 8/2000 | Paice | |
| 6,124,896 A | 9/2000 | Kurashige | |
| 6,148,092 A | 11/2000 | Qian | |
| 6,167,162 A | 12/2000 | Jacquin et al. | |
| 6,172,703 B1 | 1/2001 | Lee | 348/14.8 |
| 6,173,069 B1 | 1/2001 | Daly et al. | 382/118 |
| 6,226,035 B1 | 5/2001 | Korein et al. | |
| 6,243,130 B1 | 6/2001 | McNelley et al. | 725/105 |
| 6,249,318 B1 | 6/2001 | Girod et al. | |
| 6,256,400 B1 | 7/2001 | Takata et al. | 382/103 |
| 6,266,098 B1 | 7/2001 | Cove et al. | 348/563 |
| 6,285,392 B1 | 9/2001 | Satoda et al. | |
| 6,292,575 B1 | 9/2001 | Bortolussi et al. | 382/118 |
| 6,356,589 B1 | 3/2002 | Gebler et al. | 375/240.1 |
| 6,380,539 B1 | 4/2002 | Edgar | 250/339.5 |
| 6,424,377 B1 | 7/2002 | Driscoll, Jr. | |
| 6,430,222 B1 | 8/2002 | Okadia | 375/240.3 |
| 6,462,767 B1 | 10/2002 | Obata et al. | 348/14.8 |
| 6,493,032 B1 | 12/2002 | Wallerstein et al. | |
| 6,507,356 B1 | 1/2003 | Jackel et al. | 348/14.6 |
| 6,573,904 B1 | 6/2003 | Chun et al. | 345/629 |
| 6,577,333 B2 | 6/2003 | Tai et al. | 348/14.8 |
| 6,583,808 B2 | 6/2003 | Boulanger et al. | |
| 6,590,603 B2 | 7/2003 | Sheldon et al. | 348/14.9 |
| 6,591,314 B1 | 7/2003 | Colbath | 710/36 |
| 6,593,955 B1 | 7/2003 | Falcon | 348/14.1 |
| 6,593,956 B1 | 7/2003 | Potts et al. | 348/14.9 |
| 6,611,281 B2 | 8/2003 | Strubbe | 348/14.1 |
| 6,680,856 B2 | 1/2004 | Schreiber | |
| 6,693,663 B1 | 2/2004 | Harris | 348/14.8 |
| 6,694,094 B2 | 2/2004 | Partynski et al. | 396/7 |
| 6,704,048 B1 | 3/2004 | Malkin et al. | |
| 6,710,797 B1 | 3/2004 | McNelley et al. | 348/14.16 |
| 6,751,106 B2 | 6/2004 | Zhang et al. | |
| 6,763,226 B1 | 7/2004 | McZeal | 455/90.2 |
| 6,768,722 B1 | 7/2004 | Katseff et al. | 370/260 |
| 6,795,108 B2 | 9/2004 | Jarboe et al. | 348/14.9 |
| 6,795,558 B2 | 9/2004 | Matsuo | 381/92 |
| 6,798,834 B1 | 9/2004 | Murakami et al. | 375/240.12 |
| 6,806,898 B1 | 10/2004 | Toyama et al. | 348/14.16 |
| 6,807,280 B1 | 10/2004 | Stroud et al. | 381/106 |
| 6,831,653 B2 | 12/2004 | Kehlet et al. | 345/558 |
| 6,844,990 B2 | 1/2005 | Artonne et al. | 359/725 |
| 6,853,398 B2 | 2/2005 | Malzbender et al. | 48/14.9 |
| 6,867,798 B1 | 3/2005 | Wada et al. | 348/143 |
| 6,882,358 B1 | 4/2005 | Schuster et al. | 348/14.16 |
| 6,888,358 B2 | 5/2005 | Lechner et al. | 324/607 |
| 6,909,438 B1 | 6/2005 | White et al. | 345/629 |
| 6,911,995 B2 | 6/2005 | Ivanov et al. | 348/42 |
| 6,917,271 B2 | 7/2005 | Zhang et al. | 336/160 |
| 6,963,653 B1 | 11/2005 | Miles | 381/424 |
| 6,980,526 B2 | 12/2005 | Jang et al. | |
| 6,989,754 B2 | 1/2006 | Kiscanin et al. | 340/576 |
| 6,989,836 B2 | 1/2006 | Ramsey | 345/522 |
| 6,989,856 B2 | 1/2006 | Firestone et al. | 348/14.9 |
| 6,990,086 B1 | 1/2006 | Holur et al. | |
| 7,002,973 B2 | 2/2006 | MeLampy et al. | |
| 7,023,855 B2 | 4/2006 | Haumont et al. | 370/395.1 |
| 7,028,092 B2 | 4/2006 | MeLampy et al. | |
| 7,031,311 B2 | 4/2006 | MeLampy et al. | |
| 7,043,528 B2 | 5/2006 | Schmitt et al. | 709/204 |
| 7,046,862 B2 | 5/2006 | Ishizaka et al. | 382/298 |
| 7,057,636 B1 | 6/2006 | Cohen-Solal et al. | 348/14.8 |
| 7,057,662 B2 | 6/2006 | Malzbender | |
| 7,061,896 B2 | 6/2006 | Jabbari et al. | |
| 7,072,504 B2 | 7/2006 | Miyano et al. | 382/154 |
| 7,072,833 B2 | 7/2006 | Rajan | 704/233 |
| 7,080,157 B2 | 7/2006 | McCanne | |
| 7,092,002 B2 | 8/2006 | Ferren et al. | 348/14.8 |
| 7,111,045 B2 | 9/2006 | Kato et al. | |
| 7,126,627 B1 | 10/2006 | Lewis et al. | 348/14.16 |
| 7,131,135 B1 | 10/2006 | Virag et al. | 725/80 |
| 7,136,651 B2 | 11/2006 | Kalavade | |
| 7,139,767 B1 | 11/2006 | Taylor et al. | 1/1 |
| D533,525 S | 12/2006 | Arie | |
| D533,852 S | 12/2006 | Ma | |
| D534,511 S | 1/2007 | Maeda et al. | |
| D535,954 S | 1/2007 | Hwang et al. | |
| 7,158,674 B2 | 1/2007 | Suh | 382/170 |
| 7,161,942 B2 | 1/2007 | Chen et al. | |
| D539,243 S | 3/2007 | Chiu et al. | |
| 7,197,008 B1 | 3/2007 | Shabtay et al. | 370/218 |
| D541,773 S | 5/2007 | Chong et al. | |
| D542,247 S | 5/2007 | Kinoshita et al. | |
| 7,221,260 B2 | 5/2007 | Berezowski et al. | 340/286.5 |
| 7,239,338 B2 | 7/2007 | Krisbergh et al. | 348/14.1 |
| 7,246,118 B2 | 7/2007 | Chastain et al. | |
| D550,635 S | 9/2007 | DeMaio et al. | |
| D551,184 S | 9/2007 | Kanou et al. | |
| 7,269,292 B2 | 9/2007 | Steinberg | 382/243 |
| 7,274,555 B2 | 9/2007 | Kim et al. | 361/679.27 |
| D555,610 S | 11/2007 | Yang et al. | |
| 7,336,299 B2 | 2/2008 | Kostrzewski | |
| D567,202 S | 4/2008 | Rieu Piquet | |
| 7,352,809 B2 | 4/2008 | Wenger et al. | 375/240.2 |
| 7,353,279 B2 | 4/2008 | Durvasula et al. | |
| 7,359,731 B2 | 4/2008 | Choksi | |
| 7,399,095 B2 | 7/2008 | Rondinelli | 359/868 |
| 7,411,975 B1 | 8/2008 | Mohaban | |
| 7,413,150 B1 | 8/2008 | Hsu | 248/123.11 |
| 7,428,000 B2 | 9/2008 | Cutler et al. | |
| D578,496 S | 10/2008 | Leonard | |
| 7,440,615 B2 | 10/2008 | Gong et al. | 382/173 |
| 7,450,134 B2 | 11/2008 | Maynard et al. | 345/589 |
| 7,471,320 B2 | 12/2008 | Malkin et al. | |
| 7,477,657 B1 | 1/2009 | Murphy et al. | |
| D588,560 S | 3/2009 | Mellingen et al. | |
| 7,505,036 B1 | 3/2009 | Baldwin | 345/421 |
| 7,518,051 B2 | 4/2009 | Redmann | |
| 7,529,425 B2 | 5/2009 | Kitamura et al. | 382/275 |
| 7,532,230 B2 | 5/2009 | Culbertson et al. | 348/14.8 |

(56) References Cited

U.S. PATENT DOCUMENTS

| | | | |
|---|---|---|---|
| 7,532,232 B2 | 5/2009 | Shah et al. | 348/14.9 |
| 7,534,056 B2 | 5/2009 | Cross et al. | 396/427 |
| 7,545,761 B1 | 6/2009 | Kalbag | |
| 7,551,432 B1 | 6/2009 | Bockheim et al. | 361/679.27 |
| 7,555,141 B2 | 6/2009 | Mori | 382/103 |
| 7,575,537 B2 | 8/2009 | Ellis | 482/54 |
| 7,577,246 B2 | 8/2009 | Idan et al. | 379/265.1 |
| D602,453 S | 10/2009 | Ding et al. | |
| 7,616,226 B2 | 11/2009 | Roessler et al. | |
| 7,620,202 B2 * | 11/2009 | Fujimura et al. | 382/103 |
| 7,646,419 B2 | 1/2010 | Cernasov | 348/344 |
| D610,560 S | 2/2010 | Chen | |
| 7,679,639 B2 | 3/2010 | Harrell et al. | 348/14.8 |
| 7,692,680 B2 | 4/2010 | Graham | 348/14.1 |
| 7,707,247 B2 | 4/2010 | Dunn et al. | 709/204 |
| D615,514 S | 5/2010 | Mellingen et al. | |
| 7,710,448 B2 | 5/2010 | De Beer et al. | 348/14.1 |
| 7,710,450 B2 | 5/2010 | Dhuey et al. | 348/14.8 |
| 7,714,222 B2 | 5/2010 | Taub et al. | 84/600 |
| 7,715,657 B2 | 5/2010 | Lin et al. | 382/298 |
| 7,719,605 B2 | 5/2010 | Hirasawa et al. | 348/345 |
| 7,719,662 B2 | 5/2010 | Bamji et al. | 356/5.1 |
| 7,720,277 B2 | 5/2010 | Hattori | 382/154 |
| 7,725,919 B1 | 5/2010 | Thiagarajan et al. | 725/139 |
| D626,102 S | 10/2010 | Buzzard et al. | |
| D626,103 S | 10/2010 | Buzzard et al. | |
| D628,175 S | 11/2010 | Desai et al. | |
| 7,839,434 B2 | 11/2010 | Ciudad et al. | 348/211.12 |
| D628,968 S | 12/2010 | Desai et al. | |
| 7,855,726 B2 | 12/2010 | Ferren et al. | 348/14.8 |
| 7,861,189 B2 | 12/2010 | Watanabe et al. | 715/864 |
| 7,889,851 B2 | 2/2011 | Shah et al. | 379/202.1 |
| 7,894,531 B1 | 2/2011 | Cetin et al. | 375/240.19 |
| D636,359 S | 4/2011 | Buzzard et al. | |
| D636,747 S | 4/2011 | Buzzard et al. | |
| D637,568 S | 5/2011 | Desai et al. | |
| D637,569 S | 5/2011 | Desai et al. | |
| D637,570 S | 5/2011 | Desai et al. | |
| 8,000,559 B2 | 8/2011 | Kwon | 382/276 |
| 8,031,906 B2 * | 10/2011 | Fujimura et al. | 382/103 |
| 8,077,857 B1 | 12/2011 | Lambert | 379/406.2 |
| 8,081,346 B1 | 12/2011 | Anup et al. | 358/2.1 |
| 8,086,076 B2 | 12/2011 | Tian et al. | 382/304 |
| 8,135,068 B1 | 3/2012 | Alvarez | 375/240.16 |
| 8,179,419 B2 | 5/2012 | Girish et al. | 348/14.8 |
| 8,219,404 B2 | 7/2012 | Weinberg et al. | 704/273 |
| 8,259,155 B2 | 9/2012 | Marathe et al. | 348/14.8 |
| 8,315,466 B2 | 11/2012 | El-Maleh et al. | 382/232 |
| 8,363,719 B2 | 1/2013 | Nakayama | 375/240.3 |
| 8,374,456 B2 * | 2/2013 | Vetro et al. | 382/260 |
| 8,436,888 B1 | 5/2013 | Baldino et al. | 348/14.8 |
| 2002/0047892 A1 | 4/2002 | Gonsalves | 725/32 |
| 2002/0106120 A1 | 8/2002 | Brandenburg et al. | 382/154 |
| 2002/0108125 A1 | 8/2002 | Joao | 725/139 |
| 2002/0114392 A1 | 8/2002 | Sekiguchi et al. | 375/240.14 |
| 2002/0118890 A1 | 8/2002 | Rondinelli | 382/276 |
| 2002/0131608 A1 | 9/2002 | Lobb et al. | 381/111 |
| 2002/0140804 A1 | 10/2002 | Colmenarez et al. | |
| 2002/0149672 A1 | 10/2002 | Clapp et al. | |
| 2002/0186528 A1 | 12/2002 | Huang | 361/681 |
| 2002/0196737 A1 | 12/2002 | Bullard | 370/230 |
| 2003/0017872 A1 | 1/2003 | Oishi et al. | 463/31 |
| 2003/0048218 A1 | 3/2003 | Milnes et al. | 342/357.7 |
| 2003/0071932 A1 | 4/2003 | Tanigaki | 349/61 |
| 2003/0072460 A1 | 4/2003 | Gonopolskiy et al. | 381/92 |
| 2003/0160861 A1 | 8/2003 | Barlow et al. | 348/14.01 |
| 2003/0179285 A1 | 9/2003 | Naito | 348/14.01 |
| 2003/0185303 A1 | 10/2003 | Hall | 375/240.16 |
| 2003/0197687 A1 | 10/2003 | Shetter | 345/173 |
| 2004/0003411 A1 | 1/2004 | Nakai et al. | 345/619 |
| 2004/0032906 A1 | 2/2004 | Lillig | 382/173 |
| 2004/0038169 A1 | 2/2004 | Mandelkern et al. | 433/29 |
| 2004/0061787 A1 | 4/2004 | Liu et al. | |
| 2004/0091232 A1 | 5/2004 | Appling, III | 345/1 |
| 2004/0118984 A1 | 6/2004 | Kim et al. | 248/149 |
| 2004/0119814 A1 | 6/2004 | Clisham et al. | |
| 2004/0164858 A1 | 8/2004 | Lin | |
| 2004/0165060 A1 | 8/2004 | McNelley et al. | 348/14.16 |
| 2004/0178955 A1 | 9/2004 | Menache et al. | 342/463 |
| 2004/0189463 A1 | 9/2004 | Wathen | 340/539.1 |
| 2004/0189676 A1 | 9/2004 | Dischert | 345/639 |
| 2004/0196250 A1 | 10/2004 | Mehrotra et al. | 345/214 |
| 2004/0207718 A1 | 10/2004 | Boyden et al. | 348/14.1 |
| 2004/0218755 A1 | 11/2004 | Marton et al. | 379/406.6 |
| 2004/0246962 A1 | 12/2004 | Kopeikin et al. | |
| 2004/0254982 A1 | 12/2004 | Hoffman et al. | |
| 2004/0260796 A1 | 12/2004 | Sundqvist et al. | |
| 2005/0007954 A1 | 1/2005 | Sreemanthula et al. | |
| 2005/0024484 A1 | 2/2005 | Leonard | |
| 2005/0050246 A1 | 3/2005 | Lakkakorpi et al. | |
| 2005/0081160 A1 | 4/2005 | Wee et al. | 715/753 |
| 2005/0110867 A1 | 5/2005 | Schulz | 348/14.5 |
| 2005/0117022 A1 | 6/2005 | Marchant | 348/211.1 |
| 2005/0129325 A1 | 6/2005 | Wu | 382/154 |
| 2005/0147257 A1 | 7/2005 | Melchior et al. | |
| 2005/0248652 A1 | 11/2005 | Firestone et al. | 348/14 |
| 2005/0268823 A1 | 12/2005 | Bakker et al. | 108/50.02 |
| 2006/0013495 A1 | 1/2006 | Duan et al. | 382/107 |
| 2006/0017807 A1 | 1/2006 | Lee et al. | |
| 2006/0028983 A1 | 2/2006 | Wright | |
| 2006/0029084 A1 | 2/2006 | Grayson | 370/401 |
| 2006/0038878 A1 | 2/2006 | Takashima et al. | 38/14.09 |
| 2006/0066717 A1 | 3/2006 | Miceli | 348/14.09 |
| 2006/0072813 A1 | 4/2006 | Matsumoto et al. | 348/220.1 |
| 2006/0082643 A1 | 4/2006 | Richards | 348/36 |
| 2006/0093128 A1 | 5/2006 | Oxford | 381/56 |
| 2006/0100004 A1 | 5/2006 | Kim et al. | 455/575.3 |
| 2006/0104297 A1 | 5/2006 | Buyukkoc et al. | 370/409 |
| 2006/0104470 A1 | 5/2006 | Akino | 381/120 |
| 2006/0120307 A1 | 6/2006 | Sahashi | |
| 2006/0121568 A1 | 6/2006 | Drapeau et al. | 435/69.1 |
| 2006/0125691 A1 | 6/2006 | Menache et al. | 340/539.13 |
| 2006/0126878 A1 | 6/2006 | Takumai et al. | 381/18 |
| 2006/0152489 A1 | 7/2006 | Sweetser et al. | |
| 2006/0152575 A1 | 7/2006 | Amiel et al. | 348/14.08 |
| 2006/0158509 A1 | 7/2006 | Kenoyer et al. | 348/14.08 |
| 2006/0168302 A1 | 7/2006 | Boskovic et al. | 709/231 |
| 2006/0170769 A1 | 8/2006 | Zhou | 382/165 |
| 2006/0181607 A1 | 8/2006 | McNelley et al. | 348/14.16 |
| 2006/0200518 A1 | 9/2006 | Sinclair et al. | 709/204 |
| 2006/0233120 A1 | 10/2006 | Eshel et al. | 370/260 |
| 2006/0256187 A1 | 11/2006 | Sheldon et al. | |
| 2006/0284786 A1 | 12/2006 | Takano et al. | |
| 2007/0039030 A1 | 2/2007 | Romanowich et al. | |
| 2007/0040903 A1 | 2/2007 | Kawaguchi | 348/140 |
| 2007/0070177 A1 | 3/2007 | Christensen | 348/14.08 |
| 2007/0080845 A1 | 4/2007 | Amand | 341/176 |
| 2007/0112966 A1 | 5/2007 | Eftis et al. | 709/227 |
| 2007/0120971 A1 | 5/2007 | Kennedy | 348/14.08 |
| 2007/0121353 A1 | 5/2007 | Zhang et al. | |
| 2007/0140337 A1 | 6/2007 | Lim et al. | |
| 2007/0153712 A1 | 7/2007 | Fry et al. | 348/14.09 |
| 2007/0159523 A1 | 7/2007 | Hillis et al. | 348/14.16 |
| 2007/0183661 A1 | 8/2007 | El-Maleh et al. | 382/173 |
| 2007/0188597 A1 | 8/2007 | Kenoyer | 348/14.07 |
| 2007/0189219 A1 | 8/2007 | Navoli et al. | 370/338 |
| 2007/0192383 A1 | 8/2007 | Padmanabhan | 707/201 |
| 2007/0206091 A1 | 9/2007 | Dunn et al. | 348/14.01 |
| 2007/0206556 A1 | 9/2007 | Yegani et al. | |
| 2007/0206602 A1 | 9/2007 | Halabi et al. | 370/395.4 |
| 2007/0217406 A1 | 9/2007 | Riedel et al. | |
| 2007/0217500 A1 | 9/2007 | Gao et al. | 375/240.23 |
| 2007/0229250 A1 | 10/2007 | Recker et al. | 340/825.72 |
| 2007/0247470 A1 | 10/2007 | Dhuey et al. | 345/545 |
| 2007/0250567 A1 | 10/2007 | Graham et al. | 709/204 |
| 2007/0250620 A1 | 10/2007 | Shah et al. | 709/224 |
| 2007/0273752 A1 | 11/2007 | Chambers et al. | 455/556 |
| 2007/0279483 A1 | 12/2007 | Beers et al. | 370/254 |
| 2007/0279484 A1 | 12/2007 | Derocher et al. | 348/14.01 |
| 2007/0285505 A1 | 12/2007 | Korneliussen | 348/14.08 |
| 2008/0043041 A2 | 2/2008 | Hedenstroem et al. | 345/589 |
| 2008/0044064 A1 | 2/2008 | His | 382/118 |
| 2008/0077390 A1 | 3/2008 | Nagao | |
| 2008/0151038 A1 | 6/2008 | Khouri et al. | 348/14.01 |

(56) References Cited

U.S. PATENT DOCUMENTS

| | | | | |
|---|---|---|---|---|
| 2008/0153537 | A1 | 6/2008 | Khawand et al. | 455/550.1 |
| 2008/0167078 | A1 | 7/2008 | Eibye | 455/550.1 |
| 2008/0198755 | A1 | 8/2008 | Vasseur et al. | 370/238 |
| 2008/0208444 | A1 | 8/2008 | Ruckart | 701/201 |
| 2008/0212677 | A1 | 9/2008 | Chen et al. | 375/240.06 |
| 2008/0215974 | A1 | 9/2008 | Harrison et al. | 715/706 |
| 2008/0218582 | A1 | 9/2008 | Buckler | 348/14.08 |
| 2008/0219268 | A1 | 9/2008 | Dennison | 370/395.2 |
| 2008/0232688 | A1 | 9/2008 | Senior et al. | 382/103 |
| 2008/0232692 | A1 | 9/2008 | Kaku | 382/132 |
| 2008/0240237 | A1 | 10/2008 | Tian et al. | |
| 2008/0240571 | A1 | 10/2008 | Tian et al. | |
| 2008/0267282 | A1 | 10/2008 | Kalipatnapu et al. | 375/240.01 |
| 2008/0297586 | A1 | 12/2008 | Kurtz et al. | 348/14.01 |
| 2008/0298571 | A1 | 12/2008 | Kurtz et al. | 348/14.01 |
| 2008/0303901 | A1 | 12/2008 | Variyath et al. | |
| 2009/0009593 | A1 | 1/2009 | Cameron et al. | 348/51 |
| 2009/0051756 | A1 | 2/2009 | Trachtenberg | |
| 2009/0115723 | A1 | 5/2009 | Henty | 348/376 |
| 2009/0122867 | A1 | 5/2009 | Mauchly et al. | |
| 2009/0129753 | A1 | 5/2009 | Wagenlander | 385/95 |
| 2009/0207179 | A1 | 8/2009 | Huang et al. | 345/419 |
| 2009/0207233 | A1 | 8/2009 | Mauchly et al. | |
| 2009/0207234 | A1 | 8/2009 | Chen et al. | |
| 2009/0244257 | A1 | 10/2009 | MacDonald et al. | |
| 2009/0256901 | A1 | 10/2009 | Mauchly et al. | |
| 2009/0279476 | A1 | 11/2009 | Li et al. | 370/328 |
| 2009/0322082 | A1 | 12/2009 | Wagoner | |
| 2009/0324023 | A1 | 12/2009 | Tian et al. | |
| 2010/0008373 | A1 | 1/2010 | Xiao et al. | 370/389 |
| 2010/0014530 | A1 | 1/2010 | Cutaia | 370/401 |
| 2010/0042281 | A1 | 2/2010 | Filla | 701/22 |
| 2010/0082557 | A1 | 4/2010 | Gao et al. | |
| 2010/0123770 | A1 | 5/2010 | Friel et al. | |
| 2010/0208078 | A1 | 8/2010 | Tian et al. | 348/169 |
| 2010/0225732 | A1 | 9/2010 | De Beer et al. | |
| 2010/0225735 | A1 | 9/2010 | Shaffer et al. | |
| 2010/0241845 | A1 | 9/2010 | Alonso | 726/4 |
| 2010/0259619 | A1 | 10/2010 | Nicholson | 348/158 |
| 2010/0268843 | A1 | 10/2010 | Van Wie et al. | 709/231 |
| 2010/0277563 | A1 | 11/2010 | Gupta et al. | 348/14.08 |
| 2010/0283829 | A1 | 11/2010 | De Beer et al. | |
| 2010/0302345 | A1 | 12/2010 | Baldino et al. | |
| 2010/0316232 | A1 | 12/2010 | Acero et al. | 379/202.01 |
| 2011/0037636 | A1 | 2/2011 | Alexander | |
| 2011/0085016 | A1 | 4/2011 | Kristiansen et al. | 348/14.01 |
| 2011/0090303 | A1 | 4/2011 | Wu et al. | 348/14.16 |
| 2011/0109642 | A1 | 5/2011 | Chang et al. | 345/592 |
| 2011/0242266 | A1 | 10/2011 | Blackburn et al. | 348/14.04 |
| 2011/0249086 | A1 | 10/2011 | Guo et al. | 348/14.02 |
| 2011/0276901 | A1 | 11/2011 | Zambetti et al. | 715/753 |
| 2012/0026271 | A1 | 2/2012 | Goodman et al. | 348/14.8 |
| 2012/0038742 | A1 | 2/2012 | Robinson et al. | 348/14.16 |
| 2012/0106428 | A1 | 5/2012 | Schlicht et al. | 455/41.2 |
| 2012/0143605 | A1 | 6/2012 | Thorsen et al. | 704/235 |
| 2012/0169838 | A1 | 7/2012 | Sekine | 348/14.16 |
| 2012/0218373 | A1 | 8/2012 | N'guessan | 348/14.08 |

FOREIGN PATENT DOCUMENTS

| | | | | |
|---|---|---|---|---|
| EP | 0 740 177 | | 4/1996 | G02B 13/06 |
| EP | 1143745 | A2 | 10/2001 | H04N 9/75 |
| EP | 1 178 352 | A1 | 6/2002 | G03B 37/00 |
| EP | 1 589 758 | A1 | 10/2005 | H04N 7/15 |
| EP | 1701308 | A2 | 9/2006 | G06T 11/60 |
| EP | 1768058 | A2 | 3/2007 | G06T 11/01 |
| EP | 2073543 | A1 | 6/2009 | H04N 7/15 |
| EP | 2255531 | | 12/2010 | |
| EP | 2277308 | | 1/2011 | |
| GB | 2 294 605 | A | 5/1996 | H04N 7/14 |
| GB | 2336266 | | 10/1999 | G06T 7/00 |
| GB | 2355876 | A | 5/2001 | G01S 3/786 |
| WO | WO 94/16517 | | 7/1994 | H04M 11/00 |
| WO | WO 96/21321 | | 7/1996 | H04N 13/04 |
| WO | WO 97/08896 | | 3/1997 | H04N 7/18 |
| WO | WO 98/47291 | | 10/1998 | H04N 7/18 |
| WO | WO 99/59026 | | 11/1999 | G03B 37/00 |
| WO | WO 01/33840 | | 5/2001 | G09G 5/28 |
| WO | WO 2005/013001 | | 2/2005 | G03C 7/00 |
| WO | WO 2006/072755 | | 7/2006 | G09G 5/28 |
| WO | WO2007/106157 | | 9/2007 | H04N 7/14 |
| WO | WO2007/123946 | | 11/2007 | H04N 7/14 |
| WO | WO 2007/123960 | | 11/2007 | H04N 7/14 |
| WO | WO2008/010929 | | 1/2008 | |
| WO | WO2008/039371 | | 4/2008 | H04N 7/10 |
| WO | WO 2008/040258 | | 4/2008 | H04N 7/15 |
| WO | WO 2008/101117 | | 8/2008 | H04N 5/232 |
| WO | WO 2008/118887 | | 10/2008 | H04N 7/26 |
| WO | WO2009/088976 | | 7/2009 | H04N 7/26 |
| WO | WO 2009/102503 | | 8/2009 | H04N 7/15 |
| WO | WO 2009/120814 | | 10/2009 | H04N 7/15 |
| WO | WO 2010/059481 | | 5/2010 | H04N 7/15 |
| WO | WO2010/096342 | | 8/2010 | G06T 7/00 |
| WO | WO 2010/104765 | | 9/2010 | H04N 7/18 |
| WO | WO 2010/132271 | | 11/2010 | H04N 7/15 |
| WO | WO2012/033716 | | 3/2012 | H04N 7/14 |
| WO | WO2012/068008 | | 5/2012 | G09G 5/28 |
| WO | WO2012/068010 | | 5/2012 | G09G 5/28 |
| WO | WO2012/068485 | | 5/2012 | H04N 7/15 |
| WO | WO2013/096041 | | 6/2013 | H04N 13/00 |

OTHER PUBLICATIONS

"3D Particles Experiments in AS3 and Flash CS3," [retrieved and printed on Mar. 18, 2010]; 2 pages; http://www.flashandmath.com/advanced/fourparticles/notes.html.

3G, "World's First 3G Video Conference Service with New TV Commercial," Apr. 28, 2005, 4 pages; http://www.3g.co.uk/PR/April2005/1383.htm.

Digital Video Enterprises, "DVE Eye Contact Silhouette," 1 page, © DVE 2008; http://www.dvetelepresence.com/products/eyeContactSilhouette.asp.

"Eye Gaze Response Interface Computer Aid (Erica) tracks Eye movement to enable hands-free computer operation," UMD Communication Sciences and Disorders Tests New Technology, University of Minnesota Duluth, posted Jan. 19, 2005; 4 pages http://www.d.umn.edu/unirel/homepage/05/eyegaze.html.

France Telecom R&D, "France Telecom's Magic Telepresence Wall—Human Productivity Lab," 5 pages, retrieved and printed on May 17, 2010; http://www.humanproductivitylab.com/archive_blogs/2006/07/11/france_telecoms_magic_telepres_1.php.

Joshua Gluckman and S.K. Nayar, "Rectified Catadioptric Stereo Sensors," 8 pages, retrieved and printed on May 17, 2010; http://cis.poly.edu/~gluckman/papers/cypr00.pdf.

R.V. Kollarits, et al., "34.3: An Eye Contact Camera/Display System for Videophone Applications Using a Conventional Direct-View LCD," © 1995 SID, ISSN0097-0966X/95/2601, pp. 765-768; http://citeseerx.ist.psu.edu/viewdoc/download;jsessionid=47A1E7E028C26503975E633895D114EC?doi=10.1.1.42.1772&rep=rep1&type=pdf.

Trevor Darrell, "A Real-Time Virtual Mirror Display," 1 page, Sep. 9, 1998; http://people.csail.mit.edu/trevor/papers/1998-021/node6.html.

Video on TED.com, Pranav Mistry: the Thrilling Potential of SixthSense Technology (5 pages) and Interactive Transcript (5 pages), retrieved and printed on Nov. 30, 2010; http://www.ted.com/talks/pranav_mistry_the_thrilling_potential_of_sixthsense_technology.html.

U.S. Appl. No. 13/707,377, filed Dec. 12, 2012 entitled "System and Method for Depth-Guided Image Filtering in a Video Conference Environment," Inventor: Dihong Tian.

PCT Mar. 14, 2013 International Search Report and Written Opinion from International Application PCT/US2012/069111.

Kim, Jae Hoon et al., "New Coding Tools for Illumination and Focus Mismatch Compensation in Multiview Video Coding," IEEE Transactions on Circuits and Systems for Video Technology, IEEE Service Center, Piscataway, NJ, US. vol. 17, No. 11, Nov. 1, 2007; 17 pages.

Hong, Min-Cheol, et al., "A Reduced Complexity Loop Filter Using Coded Block Pattern and Quantization Step Size for H.26L Video

(56) References Cited

OTHER PUBLICATIONS

Coder," International Conference on Consumer Electronics, 2001 Digest of Technical Papers, ICCE, Los Angelos, CA, Jun. 19-21, 2001; 2 pages.
"Cisco Expo Germany 2009 Opening," Posted on YouTube on May 4, 2009; http://www.youtube.com/watch?v=SDKsaSIz4MK; 2 pages.
"Eye Tracking," from Wikipedia, (printed on Aug. 31, 2011) 12 pages; http://en.wikipedia.org/wiki/Eye_tracker.
"Infrared Cameras TVS-200-EX," ©2010 Electrophysics Corp. All Rights Reserved [retrieved and printed on May 24, 2010] http://www.electrophysics.com/Browse/Brw_ProductLineCategory.asp?CategoryID=184&Area=IS; 2 pages.
"RoundTable, 360 Degrees Video Conferencing Camera unveiled by Microsoft," TechShout, Jun. 30, 2006, 1 page; http://www.techshout.com/gadgets/2006/30/roundtable-360-degrees-video-conferencing-camera-unveiled-by-microsoft/#.
"Vocative Case," from Wikipedia, [retrieved and printed on Mar. 3, 2011] 11 pages; http://en.wikipedia.org/wiki/Vocative_case.
"Custom 3D Depth Sensing Prototype System for Gesture Control," 3D Depth Sensing, GestureTek, 3 pages; [Retrieved and printed on Dec. 1, 2010] http://www.gesturetek.com/3ddepth/introduction.php.
"Real-time Hand Motion/Gesture Detection for HCI-Demo 2," video clip, YouTube, posted Dec. 17, 2008 by smmy0705, 1 page; www.youtube.com/watch?v=mLT4CFLIi8A&feature=related.
"Simple Hand Gesture Recognition," video clip, YouTube, posted Aug. 25, 2008 by pooh8210, 1 page; http://www.youtube.com/watch?v=F8GVeVOdYLM&feature=related.
active8-3D—Holographic Projection—3D Hologram Retail Display & Video Project, [retrieved and printed on Feb. 24, 2009], http://www.activ8-3d.co.uk/3d_holocubes; 1 page.
Andersson, L., et al., "LDP Specification," Network Working Group, RFC 3036, Jan. 2001, 133 pages; http://tools.ietf.org/html/rfc3036.
Andreopoulos, Yiannis, et al., "In-Band Motion Compensated Temporal Filtering," Signal Processing: Image Communication 19 (2004) 653-673, 21 pages http://medianetlab.ee.ucla.edu/papers/011.pdf.
Arrington, Michael, "eJamming—Distributed Jamming," TechCrunch; Mar. 16, 2006; http://www.techcrunch.com/2006/03/16/ejamming-distributed-jamming/; 1 page.
Arulampalam, M. Sanjeev, et al., "A Tutorial on Particle Filters for Online Nonlinear/Non-Gaussian Bayesian Tracking," IEEE Transactions on Signal Processing, vol. 50, No. 2, Feb. 2002, 15 pages; http://www.cs.ubc.ca/~murphyk/Software/Kalman/ParticleFilterTutorial.pdf.
Avrithis, Y., et al., "Color-Based Retrieval of Facial Images," European Signal Processing Conference (EUSIPCO '00), Tampere, Finland; Sep. 2000; http://www.image.ece.ntua.gr/~ntsap/presentations/eusipco00.ppt#256; 18 pages.
Awduche, D., et al., "Requirements for Traffic Engineering over MPLS," Network Working Group, RFC 2702, Sep. 1999, 30 pages; http://tools.ietf.org/pdf/rfc2702.pdf.
Bakstein, Hynek, et al., "Visual Fidelity of Image Based Rendering," Center for Machine Perception, Czech Technical University, Proceedings of the Computer Vision, Winter 2004, http://www.benogo.dk/publications/Bakstein-Pajdla-CVWW04.pdf; 10 pages.
Beesley, S.T.C., et al., "Active Macroblock Skipping in the H.264 Video Coding Standard," in Proceedings of 2005 Conference on Visualization, Imaging, and Image Processing—VIIP 2005, Sep. 7-9, 2005, Benidorm, Spain, Paper 480-261. ACTA Press, ISBN: 0-88986-528-0; 5 pages.
Berzin, O., et al., "Mobility Support Using MPLS and MP-BGP Signaling," Network Working Group, Apr. 28, 2008, 60 pages; http://www.potaroo.net/ietf/all-/draft-berzin-malis-mpls-mobility-01.txt.
Boccaccio, Jeff; CEPro, "Inside HDMI CEC: The Little-Known Control Feature," Dec. 28, 2007; http://www.cepro.com/article/print/inside_hdmi_cec_the_little_known_control_feature; 2 pages.
Boros, S., "Policy-Based Network Management with SNMP," Proceedings of the EUNICE 2000 Summer School Sep. 13-15, 2000, p. 3.
Chan, Eric, et al., "Experiments on block-matching techniques for video coding," Multimedia Systems; 9 Springer-Verlag 1994, Multimedia Systems (1994) 2 pages 228-241.
Chen et al., "Toward a Compelling Sensation of Telepresence: Demonstrating a Portal to a Distant (Static) Office," Proceedings Visualization 2000; VIS 2000; Salt Lake City, UT, Oct. 8-13, 2000; Annual IEEE Conference on Visualization, Los Alamitos, CA; IEEE Comp. Soc., US, Jan. 1, 2000, pp. 327-333; http://citeseerx.ist.psu.edu/viewdoc/summary?doi=10.1.1.35.1287.
Chen, Jason, "iBluetooth Lets iPhone Users Send and Receive Files Over Bluetooth," Mar. 13, 2009; http://i.gizmodo.com/5169545/ibluetooth-lets-iphone-users-send-and-receive-files-over-bluetooth; 1 page.
Chen, Qing, et al., "Real-time Vision-based Hand Gesture Recognition Using Haar-like Features," Instrumentation and Measurement Technology Conference, Warsaw, Poland, May 1-3, 2007, 6 pages;http://www.google.com/url?sa=t&source=web&cd=1&ved=0CB4QFjAA&url=http%3A%2F%2Fciteseerx.ist.psu.edu%2Fviewdoc%2Fdownload%3Fdoi%3D10.1.1.93.103%26rep%3Drep1%26type%3Dpdf&ei=A28RTLKRDeftnQeXzZGRAw&usg=AFQjCNHpwj5MwjgGp-3goVzSWad6CO-Jzw.
Chien et al., "Efficient moving Object Segmentation Algorithm Using Background Registration Technique," IEEE Transactions on Circuits and Systems for Video Technology, vol. 12, No. 7, Jul. 2002, 10 pages.
Cisco: Bill Mauchly and Mod Marathe; UNC: Henry Fuchs, et al., "Depth-Dependent Perspective Rendering," Apr. 15, 2008; 6 pages.
Costa, Cristina, et al., "Quality Evaluation and Nonuniform Compression of Geometrically Distorted Images Using the Quadtree Distorion Map," EURASIP Journal on Applied Signal Processing, Jan. 7, 2004, vol. 2004, No. 12; ©2004 Hindawi Publishing Corp.; XP002536356; ISSN: 1110-8657; pp. 1899-1911; http://downloads.hindawi.com/journals/asp/2004/470826.pdf.
Criminisi, A., et al., "Efficient Dense-Stereo and Novel-view Synthesis for Gaze Manipulation in One-to-one Teleconferencing," Technical Rpt MSR-TR-2003-59, Sep. 2003 [retrieved and printed on Feb. 26, 2009], http://research.microsoft.com/pubs/67266/criminis_techrep2003-59.pdf, 41 pages.
Cumming, Jonathan, "Session Border Control in IMS, an Analysis of the Requirements for Session Border Control in IMS Networks," Sections 1.1, 1.1.1, 1.1.3, 1.1.4, 2.1.1, 3.2, 3.3.1, 5.2.3 and pp. 7-8, Data Connection, 2005.
Daly, S., et al., "Face-based visually-optimized image sequence coding," Image Processing, 1998. ICIP 98. Proceedings; 1998 International Conference on Chicago, IL; Oct. 4-7, 1998, Los Alamitos; IEEE Computing; vol. 3, Oct. 4, 1998; ISBN: 978-0-8186-8821-8; XP010586786; pp. 443-447.
Diaz, Jesus, "Zcam 3D Camera is Like Wii Without Wiimote and Minority Report Without Gloves," Dec. 15, 2007; http://gizmodo.com/gadgets/zcam-depth-camera-could-be-wii-challenger/zcam-3d-camera-is-like-wii-without-wiimote-and-minority-report-without-gloves-334426.php; 3pages.
Diaz, Jesus, iPhone Bluetooth File Transfer Coming Soon (Yes!); Jan. 26, 2009; http://i.gizmodo.com/5138797/iphone-bluetooth-file-transfer-coming-soon-yes; 1page.
Davoine F., et al., "Head and Facial Animation Tracking Using Appearance-Adaptive Models and Particle Filters," 20040627; 20040627-20040602, Jun. 27, 2004, 22 pages; Heudiasy Research Lab; http://eprints.pascal-network.org/archive/00001231/01/rtvhci_chapter8.pdf.
DVE Digital Video Enterprises, "DVE Tele-Immersion Room," ©2006 Digital Video Enterprises, Inc., [retrieved on Feb. 5, 2009] http://www.dvetelepresence.com/products/immersion_room.asp; 2 pages.
"Dynamic Displays," copyright 2005-2008 [retrieved and printed on Feb. 24, 2009] http://www.zebraimaging.com/html/lighting_display.html, 2 pages.
ECmag.com, "IBS Products," Published Apr. 2009; ©2003-2010 Electrical Contractor, 3 Bethesda Metro Center, Suite 1100, Bethesda, MD; http://www.ecmag.com/index.cfm?fa=article&articleID=10065; 2 pages.
Eisert, Peter, "Immersive 3-D Video Conferencing: Challenges, Concepts and Implementations," Proceedings of SPIE Visual Communications and Image Processing (VCIP), Lugano, Switzerland, Jul. 2003; 11 pages;http://iphome.hhi.de/eisert/papers/vcip03.pdf.

(56) References Cited

OTHER PUBLICATIONS

"eJamming Audio, Learn More;" ©2010 damming Audio, All Rights Reserved; [retrieved and printed on May 27, 2010] http://www.ejamming.com/learnmore/; 4 pages.

Electrophysics Glossary, "Infrared Cameras, Thermal Imaging, Night Vision, Roof Moisture Detection," ©2010 Electrophysics Corp. All Rights Reserved;[retrieved and printed on Mar. 18, 2010] http://www.electrophysics.com/Browse/Brw_Glossary.asp; 11 pages.

Farrukh, A., et al., Automated Segmentation of Skin-Tone Regions in Video Sequences, Proceedings IEEE Students Conference, ISCON_apos_02; Aug. 16-17, 2002; pp. 122-128.

Fiala, Mark, "Automatic Projector Calibration Using Self-Identifying Patterns," National Research Council of Canada, Jun. 20-26, 2005; http://www.procams.org/ procams2005/papers/procams05-36.pdf; 6 pages.

Foote, J., et al., "Flycam: Practical Panoramic Video and Automatic Camera Control," in Proceedings of IEEE International Conference on Multimedia and Expo, vol. III, Jul. 30, 2000; pp. 1419-1422;http://citeseerx.ist.psu.edu/viewdoc/versions?doi=10.1.1.138.8686.

France Telecom R&D, "France Telecom's Magic Telepresence Wall—Human Productivity Lab," Human Productivity Lab, Telepresence Consulting, Jun. 11, 2006, 5 pages [retrieved and printed on May 17, 2010];http://www.humanproductivitylab.com/archive_blogs/2006/07/11/france_telecoms_magic_telepres_1.php.

Garg, Ashutosh, et al., "Audio-Visual ISpeaker Detection Using Dynamic Bayesian Networks," IEEE International Conference on Automatic Face and Gesture Recognition, 2000 Proceedings, 7 pages; http://www.ifp.illinois.edu/~ashutosh/papers/FG00.pdf.

Gemmell, Jim, et al., "Gaze Awareness for Video-conferencing: A Software Approach," IEEE MultiMedia, Oct.-Dec. 2000; vol. 7, No. 4, pp. 26-35.

Geys et al., "Fast Interpolated Cameras by Combining a GPU Based Plane Sweep With a Max-Flow Regularisation Algorithm," Sep. 9, 2004; 3D Data Processing, Visualization and Transmission 2004, pp. 534-541.

Gluckman, Joshua, et al., "Rectified Catadioptric Stereo Sensors," 8 pages, retrieved and printed on May 17, 2010; http://cis.poly.edu/~guckman/papers/cypr00.pdf.

Gotchev, Atanas, "Computer Technologies for 3D Video Delivery for Home Entertainment," International Conference on Computer Systems and Technologies; CompSysTech, Jun. 12-13, 2008; http://ecet.ecs.ru.acad.bg/cst08/docs/cp/Plenary/P.1.pdf; 6 pages.

Gries, Dan, "3D Particles Experiments in AS3 and Flash CS3, Dan's Comments," [retrieved and printed on May 24, 2010] http://www.flashandmath.com/advanced/fourparticles/notes.html; 3 pages.

Guernsey, Lisa, "Toward Better Communication Across the Language Barrier," New York Times, Jul. 29, 1999; http://www.nytimes.com/1999/07/29/technology/toward-better-communication-across-the-language-barrier.html; 2 pages.

Guili, D., et al., "Orchestra!: A Distributed Platform for Virtual Musical Groups and Music Distance Learning over the Internet in JavaTM Technology"; [retrieved and printed on Jun. 6, 2010] http://ieeexplore.ieee.org/stamp/stamp.jsp?tp=&arnumber=778626; 2 pages.

Gundavelli, S., et al., "Proxy Mobile IPv6," Network Working Group, RFC 5213, Aug. 2008, 93 pages; http://tools.ietf.org/pdf/rfc5213.pdf.

Gussenhoven, Carlos, "Chapter 5 Transcription of Dutch Intonation," Nov. 9, 2003, 33 pages; http://www.ru.nl/publish/pages/516003/todisun-ah.pdf.

Gvili, Ronen et al., "Depth Keying," 3DV System Ltd., [Retrieved and printed on Dec. 5, 2011] 11 pages; http://research.microsoft.com/en-us/um/people/eyalofek/Depth%20Key/DepthKey.pdf.

Habili, Nariman, et al., "Segmentation of the Face and Hands in Sign Language Video Sequences Using Color and Motion Cues" IEEE Transaction on Circuits and Systems for Video Technology, IEEE Service Center, vol. 14, No. 8, Aug. 1, 2004; ISSN: 1051-8215; XP011115755; pp. 1086-1097.

Hammadi, Nait Charif et al., "Tracking the Activity of Participants in a Meeting," Machine Vision and Applications, Springer, Berlin, De Lnkd—D01:10.1007/S00138-006-0015-5, vol. 17, No. 2, May 1, 2006, pp. 83-93, XP019323925 http://citeseerx.ist.psu.edu/viewdoc/summary?doi=10.1.1.106.9832.

He, L., et al., "The Virtual Cinematographer: A Paradigm for Automatic Real-Time Camera Control and Directing," Proc. SIGGRAPH, ©1996; http://research.microsoft.com/en-us/um/people/lhe/papers/siggraph96.vc.pdf; 8 pages.

Hepper, D., "Efficiency Analysis and Application of Uncovered Background Prediction in a Low BitRate Image Coder," IEEE Transactions on Communications, vol. 38, No. 9, pp. 1578-1584, Sep. 1990.

Hock, Hans Henrich, "Prosody vs. Syntax: Prosodic rebracketing of final vocatives in English," 4 pages; [retrieved and printed on Mar. 3, 2011] http://speechprosody2010.illinois.edu/papers/100931.pdf.

Holographic Imaging, "Dynamic Holography for scientific uses, military heads up display and even someday HoloTV Using Ti's DMD," [retrieved and printed on Feb. 26, 2009] http://innovation.swmed.edu/research/instrumentation/res_inst_dev3d.html; 5 pages.

Hornbeck, Larry J., Texas Instruments, "Digital Light ProcessingTM: A New MEMS-Based Display Technology," [retrieved and printed on Feb. 26, 2009] http://focus.ti.com/pdfs/dlpdmd/17_Digital_Light_Processing_MEMS_display_technology.pdf; 22 pages.

IR Distribution Category @ Envious Technology, "IR Distribution Category," ©2009 Envious Technology; [retrieved and printed on Apr. 22, 2009] http://www.envioustechnology.com.au/products/product-list.php?CID=305; 2 pages.

IR Trans—Products and Orders—Ethernet Devices; ©2005-2009 IRTrans GMbH [retrieved and printed on Apr. 22, 2009] http://www.irtrans.de/en/shop/lan.php; 2 pages.

Isgro, Francesco et al., "Three-Dimensional Image Processing in the Future of Immersive Media," IEEE Transactions on Circuits and Systems for Video Technology, vol. 14, No. 3; XP011108796; ISSN: 1051-8215; Mar. 1, 2004; pp. 288-303.

Itoh, Hiroyasu, et al., "Use of a gain modulating framing camera for time-resolved imaging of cellular phenomena," SPIE vol. 2979, 1997, pp. 733-740.

Jamoussi, Bamil, "Constraint-Based LSP Setup Using LDP," MPLS Working Group, Sep. 1999, 34 pages; http://tools.ietf.org/html/draft-ietf-mpls-cr-ldp-03.

Jeyatharan, M., et al., "3GPP TFT Reference for Flow Binding," MEXT Working Group, Mar. 2, 2010, 11 pages; http:/www.ietf.org/id/draft-jeyatharan-mext-flow-tftemp-reference-00.txt.

Jiang, Minqiang, et al., "On Lagrange Multiplier and Quantizer Adjustment for H.264 Frame-layer Video Rate Control," IEEE Transactions on Circuits and Systems for Video Technology, vol. 16, Issue 5, May 2006, pp. 663-669.

Jong-Gook Ko et al., "Facial Feature Tracking and Head Orientation-Based Gaze Tracking," ITC-CSCC 2000, International Technical Conference on Circuits/Systems, Jul. 11-13, 2000, 4 pages http://www.umiacs.umd.edu/~knkim/paper/itc-cscc-2000-jgko.pdf.

Kannangara, C.S., et al., "Complexity Reduction of H.264 Using Lagrange Multiplier Methods," IEEE Int. Conf. on Visual Information Engineering, Apr. 2005; www.rgu.ac.uk/files/h264_complexity_kannangara.pdf; 6 pages.

Kannangara, C.S., et al., "Low Complexity Skip Prediction for H.264 through Lagrangian Cost Estimation," IEEE Transactions on Circuits and Systems for Video Technology, vol. 16, No. 2, Feb. 2006; www.rgu.ac.uk/files/h264_skippredict_richardson_final.pdf; 20 pages.

Kauff, Peter, et al., "An Immersive 3D Video-Conferencing System Using Shared Virtual Team User Environments," Proceedings of the 4th International Conference on Collaborative Virtual Environments, XP040139458; Sep. 30, 2002; http://ip.hhi.de/imedia_G3/assets/pdfs/CVE02.pdf; 8 pages.

Kazutake, Uehira, "Simulation of 3D image depth perception in a 3D display using two stereoscopic displays at different depths," Jan. 30, 2006; http://adsabs.harvard.edu/abs/2006SPIE.6055.408U; 2 pages.

Keijser, Jeroen, et al., "Exploring 3D Interaction in Alternate Control-Display Space Mappings," IEEE Symposium on 3D User Interfaces, Mar. 10-11, 2007, pp. 17-24.

(56) References Cited

OTHER PUBLICATIONS

Kim, Y.H., et al., "Adaptive mode decision for H.264 encoder," Electronics letters, vol. 40, Issue 19, pp. 1172-1173, Sep. 2004; 2 pages.

Klint, Josh, "Deferred Rendering in Leadwerks Engine," Copyright Leadwerks Corporation © 2008; http://www.leadwerks.com/files/Deferred_Rendering_in_Leadwerks_Engine.pdf; 10 pages.

Kolsch, Mathias, "Vision Based Hand Gesture Interfaces for Wearable Computing and Virtual Environments," A Dissertation submitted in partial satisfaction of the requirements for the degree of Doctor of Philosophy in Computer Science, University of California, Santa Barbara, Nov. 2004, 288 pages (in three parts); http://fulfillment.umi.com/dissertations/b7afbcb56ba72fdb14d26dfccc6b470f/1291487062/3143800.pdf.

Koyama, S., et al. "A Day and Night Vision Mos Imager with Robust Photonic-Crystal-Based RGB-and-IR," Mar. 2008, pp. 754-759; ISSN: 0018-9383; IEE Transactions on Electron Devices, vol. 55, No. 3; http://ieeexplore.ieee.org/stamp/stamp.jsp?tp=&arnumber=4455782&isnumber=4455723.

Kwolek, B., "Model Based Facial Pose Tracking Using a Particle Filter," Geometric Modeling and Imaging—New Trends, 2006 London, England Jul. 5-6, 2005, Piscataway, NJ, USA, IEEE LNKD-DOI: 10.1109/Gmai.2006.34 Jul. 5, 2006, pp. 203-208; XP010927285 [Abstract Only].

Lambert, "Polycom Video Communications," ©2004 Polycom, Inc., Jun. 20, 2004 http://www.polycom.com/global/documents/whitepapers/video_communications_h.239_people_content_polycom_patented_technology.pdf.

Lawson, S., "Cisco Plans TelePresence Translation Next Year," PC World Communications, Inc.; Dec. 9, 2008; http://www.pcworld.com/article/155237/.html?tk=rss_news; 2 pages.

Lee, J. And Jeon, B., "Fast Mode Decision for H.264," ISO/IEC MPEG and ITU-T VCEG Joint Video Team, Doc. JVT-J033, Dec. 2003; http://media.skku.ac.kr/publications/paper/IntC/Ijy_ICME2004.pdf; 4 pages.

Liu, Shan, et al., "Bit-Depth Scalable Coding for High Dynamic Range Video," SPIE Conference on Visual Communications and Image Processing, Jan. 2008; 12 pages http://www.merl.com/papers/docs/TR2007-078.pdf.

Liu, Z., "Head-Size Equalization for Better Visual Perception of Video Conferencing," Proceedings, IEEEInternational Conference on Multimedia & Expo (ICME2005), Jul. 6-8, 2005, Amsterdam, The Netherlands; http://research.microsoft.com/users/cohen/HeadSizeEqualizationICME2005.pdf; 4 pages.

Mann, S., et al., "Virtual Bellows: Constructing High Quality Still from Video," Proceedings, First IEEE International Conference on Image Processing ICIP-94, Nov. 13-16, 1994, Austin, TX; http://citeseerx.ist.psu.edu/viewdoc/summary?doi=10.1.1.50.8405; 5 pages.

Marvin Imaging Processing Framework, "Skin-colored pixels detection using Marvin Framework," video clip, YouTube, posted Feb. 9, 2010 by marvinproject, 1 page; http://www.youtube.com/user/marvinproject#p/a/u/0/3ZuQHYNlcrl.

Miller, Gregor, et al., "Interactive Free-Viewpoint Video," Centre for Vision, Speech and Signal Processing, [retrieved and printed on Feb. 26, 2009], http://www.ee.surrey.ac.uk/CVSSP/VMRG/Publications/miller05cvmp.pdf, 10 pages.

Miller, Paul, "Microsoft Research patents controller-free computer input via EMG muscle sensors," Engadget.com, Jan. 3, 2010, 1 page; http://www.engadget.com/2010/01/03/microsoft-research-patents-controller-free-computer-input-via-em/.

"Minoru from Novo is the worlds first consumer 3D Webcam," Dec. 11, 2008; http://www.minoru3d.com; 4 pages.

Mitsubishi Electric Research Laboratories, copyright 2009 [retrieved and printed on Feb. 26, 2009], http://www.merl.com/projects/3dtv, 2 pages.

Nakaya, Y., et al. "Motion Compensation Based on Spatial Transformations," IEEE Transactions on Circuits and Systems for Video Technology, Jun. 1994, Abstract Only http://ieeexplore.ieee.org/Xplore/login.jsp?url=http%3A%2F%2Fieeexplore.ieee.org%2Fiel5%2F76%2F7495%2F00305878.pdf%3Farnumber%3D305878&authDecision=-203.

National Training Systems Association Home—Main, Interservice/Industry Training, Simulation & Education Conference, Dec. 1-4, 2008; http://ntsa.metapress.com/app/home/main.asp?referrer=default; 1 page.

Oh, Hwang-Seok, et al., "Block-Matching Algorithm Based on Dynamic Search Window Adjustment," Dept. of CS, KAIST, 1997, 6 pages; http://citeseerx.ist.psu.edu/viewdoc/similar?doi=10.1.1.29.8621&type=ab.

"Opera Over Cisco TelePresence at Cisco Expo 2009, in Hannover Germany—Apr. 28, 29," posted on YouTube on May 5, 2009; http://www.youtube.com/watch?v=xN5jNH5E-38; 1 page.

Optoiq, "Vision + Automation Products—VideometerLab 2," [retrieved and printed on Mar. 18, 2010], http://www.optoiq.com/optoiq-2/en-us/index/machine-vision-imaging-processing/display/vsd-articles-tools-template.articles.vision-systems-design.volume-11.issue-10.departments.new-products.vision-automation-products.htmlhtml; 11 pages.

Optoiq, "Anti-Speckle Techniques Uses Dynamic Optics," Jun. 1, 2009; http://www.optoiq.com/index/photonics-technologies-applications/lfw-display/lfw-article-display/363444/articles/optoiq2/photonics-technologies/technology-products/optical-components/optical-mems/2009/12/anti-speckle-technique-uses-dynamic-optics/QP129867/cmpid=EnlOptoLFWJanuary132010.html; 2 pages.

Optoiq, "Smart Camera Supports Multiple Interfaces," Jan. 22, 2009; http://www.optoiq.com/index/machine-vision-imaging-processing/display/vsd-article-display/350639/articles/vision-systems-design/daily-product-2/2009/01/smart-camera-supports-multiple-interfaces.html; 2 pages.

Optoiq, "Vision Systems Design—Machine Vision and Image Processing Technology," [retrieved and printed on Mar. 18, 2010], http://www.optoiq.com/index/machine-vision-imaging-processing.html; 2 pages.

Patterson, E.K., et al., "Moving-Talker, Speaker-Independent Feature Study and Baseline Results Using the CUAVE Multimodal Speech Corpus," EURASIP Journal on Applied Signal Processing, vol. 11, Oct. 2002, 15 pages http://www.clemson.edu/ces/speech/papers/CUAVE_Eurasip2002.pdf.

Payatagool, Chris, "Orchestral Manoeuvres in the Light of Telepresence," Telepresence Options, Nov. 12, 2008;http://www.telepresenceoptions.com/2008/11/orchestral_manoeuvres; 7 pgs.

Perez, Patrick, et al., "Data Fusion for Visual Tracking with Particles," Proceedings of the IEEE, vol. XX, No. XX, Feb. 2004, 18 pages http://citeseer.ist.psu.edu/viewdoc/summary?doi=10.1.1.6.2480.

Pixel Tools "Rate Control and H.264: H.264 rate control algorithm dynamically adjusts encoder parameters," [retrieved and printed on Jun. 10, 2010] http://www.pixeltools.om/rate_control_paper.html; 7 pages.

Potamianos, G., et al., "An Image Transform Approach for HMM Based Automatic Lipreading," in Proceedings of IEEE ICIP, vol. 3, 1998, 5 pages http://citeseerx.ist.psu.edu/viewdoc/summary?doi=10.1.1.13.6802.

Radhika, N., et al., "Mobile Dynamic reconfigurable Context aware middleware for Adhoc smart spaces," Academic Open Internet Journal, ISSN 1311-4360, vol. 22, 2008; 3 pages http://www.acadjournal.com/2008/V22/part6/p7.

"Rayvel Business-to-Business Products," copyright 2004 [retrieved and printed on Feb. 24, 2009], http://www.rayvel.com/b2b.html; 2 pages.

Richardson, I.E.G., et al., "Fast H.264 Skip Mode Selection Using and Estimation Framework," Picture Coding Symposium, (Beijing, China), Apr. 2006; www.rgu.ac.uk/files/richardson_fast_skip_estmation_pcs06.pdf; 6 pages.

Richardson, Iain, et al., "Video Encoder Complexity Reduction by Estimating Skip Mode Distortion," Image Communication Technol-

(56) References Cited

OTHER PUBLICATIONS ogy Group; [Retrieved and printed Oct. 21, 2010] 4 pages; http://www4.rgu.ac.uk/files/ICIP04_richardson_zhao_final.pdf.
Rikert, T.D., et al., "Gaze Estimation using Morphable models," IEEE International Conference on Automatic Face and Gesture Recognition, Apr. 1998; 7 pgs. http://citeseer.ist.psu.edu/viewdoc/summary?doi=10.1.1.30.9472.
Butler, Darren, et al., "Robust Face Localisation Using Motion, Colour & Fusion" ; Proc. VIIth Digital Image Computing: Techniques and Applications, Sun C. et al (Eds.), Sydney; XP007905630; pp. 899-908; Dec. 10, 2003; http://www.cmis.csiro.au/Hugues.Talbot/dicta2003/cdrom/pdf/0899.pdf.
Satoh, Kiyohide et al., "Passive Depth Acquisition for 3D Image Displays", IEICE Transactions on Information and Systems, Information Systems Society, Tokyo, JP, Sep. 1, 1994, vol. E77-D, No. 9, pp. 949-957.
School of Computing, "Bluetooth over IP for Mobile Phones," 2005; http://www.computing.dcu.ie/wwwadmin/fyp-abstract/list/fyp_details05.jsp?year=2005&number=51470574; 1 page.
Schroeder, Erica, "The Next Top Model—Collaboration," Collaboration, the Workspace: A New World of Communications and Collaboration, Mar. 9, 2009; http//blogs.cisco.com/collaboration/comments/the_next_top_model; 1 page.
Sena, "Industrial Bluetooth," [retrieved and printed on Apr. 22, 2009] http://www.sena.com/products/industrial_bluetooth; 1 page.
Shaffer, Shmuel, "Translation—State of the Art" presentation; Jan. 15, 2009; 22 pages.
Shi, C. et al., "Automatic Image Quality Improvement for Videoconferencing," IEEE ICASSP May 2004; http://research.microsoft.com/pubs/69079/0300701.pdf; 4 pages.
Shum, H.-Y, et al., "A Review of Image-Based Rendering Techniques," in SPIE Proceedings vol. 4067(3); Proceedings of the Conference on Visual Communications and Image Processing 2000, Jun. 20-23, 2000, Perth, Australia; pp. 2-13; https://research.microsoft.com/pubs/68826/review_image_rendering.pdf.
Smarthome, "IR Extender Expands Your IR Capabilities," [retrieved and printed on Apr. 22, 2009], http://www.smarthome.com/8121.html; 3 pages.
Soliman, H., et al., "Flow Bindings in Mobile IPv6 and NEMO Basic Support," IETF MEXT Working Group, Nov. 9, 2009, 38 pages; http://tools.ietf.org/html/draft-ietf-mext-flow-binding-04.
Sonoma Wireworks Forums, "Jammin on Rifflink," [retrieved and printed on May 27, 2010] http://www.sonomawireworks.com/forums/viewtopic.php?id=2659; 5 pages.
Sonoma Wireworks Rifflink, [retrieved and printed on Jun. 2, 2010] http://www.sonomawireworks.com/rifflink.php; 3 pages.
Soohuan, Kim, et al., "Block-based face detection scheme using face color and motion estimation," Real-Time Imaging VIII; Jan. 20-22, 2004, San Jose, CA; vol. 5297, No. 1; Proceedings of the SPIE—The International Society for Optical Engineering SPIE-Int. Soc. Opt. Eng USA ISSN: 0277-786X; XP007905596; pp. 78-88.
Sudan, Ranjeet, "Signaling in MPLS Networks with RSVP-TE-Technology Information," Telecommunications, Nov. 2000, 3 pages; http://findarticles.com/p/articles/mi_mOTLC/is_11_34/ai_67447072/.
Sullivan, Gary J., et al., "Video Compression—From Concepts to the H.264/AVC Standard," Proceedings IEEE, vol. 93, No. 1, Jan. 2005; http://ip.hhi.de/imagecom_G1/assets/pdfs/pieee_sullivan_wiegand_2005.pdf; 14 pages.
Sun, X., et al., "Region of Interest Extraction and Virtual Camera Control Based on Panoramic Video Capturing," IEEE Trans. Multimedia, Oct. 27, 2003; http://vision.ece.ucsb.edu/publications/04mmXdsun.pdf; 14 pages.
"Super Home Inspectors or Super Inspectors," [retrieved and printed on Mar. 18, 2010] http://www.umrt.com/PageManager/Default.aspx/PageID=2120325; 3 pages.
Tan, Kar-Han, et al., "Appearance-Based Eye Gaze Estimation," In Proceedings IEEE WACV'02, 2002, 5 pages; http://citeseer.ist.psu.edu/viewdoc/summary?doi=10.1.1.19.8921.
Total Immersion, Video Gallery, copyright 2008-2009 [retrieved and printed on Feb. 26, 2009], http://www.t-immersion.com/en,videogallery,36.html, 1 page.
Trucco, E., et al., "Real-Time Disparity Maps for Immersive 3-D Teleconferencing by Hybrid Recursive Matching and Census Transform," [retrieved and printed on May 4, 2010] http://server.cs.ucf.edu/~vision/papers/VidReg-final.pdf; 9 pages.
Tsapatsoulis, N., et al., "Face Detection for Multimedia Applications," Proceedings of the ICIP Sep. 10-13 2000, Vancouver, BC, Canada; vol. 2, pp. 247-250.
Tsapatsoulis, N., et al., "Face Detection in Color Images and Video Sequences," 10th Mediterranean Electrotechnical Conference (MELECON), May 29-31, 2000; vol. 2; pp. 498-502.
Veratech Corp., "Phantom Sentinel," ©VeratechAero 2006, 1 page; http://www.veratechcorp.com/phantom.html.
Vertegaal, Roel, et al., "GAZE-2: Conveying Eye Contact in Group Video Conferencing Using Eye-Controlled Camera Direction," CHI 2003, Apr. 5-10, 2003, Fort Lauderdale, FL; Copyright 2003 ACM 1-58113-630-7/03/0004; 8 pages; http://www.hml.queensu.ca/papers/vertegaalchi0403.pdf.
Wachs, J., et al., "A Real-time Hand Gesture System Based on Evolutionary Search," Vision, Quarter 2006, vol. 22, No. 3, 18 pages; http://web.ics.purdue.edu/~jpwachs/papers/3q06vi.pdf.
Wang, Hualu, et al., "A Highly Efficient System for Automatic Face Region Detection inMPEG Video," IEEE Transactions on Circuits and Systems for Video Technology; vol. 7, Issue 4; 1977 pp. 615-628.
Wang, Robert and Jovan Popovic, "Bimanual rotation and scaling," video clip, YouTube, posted by rkeltset on Apr. 14, 2010, 1 page; http://www.youtube.com/watch?v=7TPFSCX79U.
Wang, Robert and Jovan Popovic, "Desktop virtual reality," video clip, YouTube, posted by rkeltset on Apr. 8, 2010, 1 page; http://www.youtube.com/watch?v=9rBtm62Lkfk.
Wang, Robert and Jovan Popovic, "Gestural user input," video clip, YouTube, posted by rkeltset on May 19, 2010, 1 page; http://www.youtube.com/watch?v=3JWYTtBjdTE.
Wang, Robert and Jovan Popovic, "Manipulating a virtual yoke," video clip, YouTube, posted by rkeltset on Jun. 8, 2010, 1 page; http://www.youtube.com/watch?v=UfgGOO2uM.
Wang, Robert and Jovan Popovic, "Real-Time Hand-Tracking with a Color Glove, ACM Transaction on Graphics," 4 pages, [Retrieved and printed on Dec. 1, 2010] http://people.csail.mit.edu/rywang/hand.
Wang, Robert and Jovan Popovic, "Real-Time Hand-Tracking with a Color Glove, ACM Transaction on Graphics" (SIGGRAPH 2009), 28(3), Aug. 2009; 8 pages http://people.csail.mitedu/rywang/handtracking/s09-hand-tracking.pdf.
Wang, Robert and Jovan Popovic, "Tracking the 3D pose and configuration of the hand," video clip, YouTube, posted by rkeltset on Mar. 31, 2010, 1 page; http://www.youtube.com/watch?v=J0XwJkWP6Sw.
Weinstein et al., "Emerging Technologies for Teleconferencing and Telepresence," Wainhouse Research 2005; http://www.ivci.com/pdf/whitepaper-emerging-technologies-for-teleconferencing-and-telepresence.pdf.
Westerink, P.H., et al., "Two-pass MPEG-2 variable-bitrate encoding," IBM Journal of Research and Development, Jul. 1991, vol. 43, No. 4; http://citeerx.ist.psu.edu/viewdoc/summary?doi=10.1.1.128.421; 18 pages.
Wiegand, T., et al., "Efficient mode selection for block-based motion compensated video coding," Proceedings, 1995 International Conference on Image Processing IIP 1995, pp. 2559-2562; citeseer.ist.psu.edu/wiegand95efficient.html.
Wiegand, T., et al., "Rate-distortion optimized mode selection for very low bit rate video coding and the emerging H.263 standard," IEEE Trans. Circuits Syst. Video Technol., Apr. 1996, vol. 6, No. 2, pp. 182-190.
"Wi-Fi Protected Setup," from Wikipedia, Sep. 2, 2010, 3 pages http://en.wikipedia.org/wiki/Wi-Fi_Protected_Setup.
Wilson, Mark, "Dreamoc 3D Display Turns Any Phone Into Hologram Machine," Oct. 30, 2008; http://gizmodo.com/5070906/dreamoc-3d-display-turns-any-phone-into-hologram-machine;4 pgs.

(56) References Cited

OTHER PUBLICATIONS

Wirelessdevnet, Melody Launches Bluetooth Over IP, Jun. 5, 2001 [retrieved and printed on Apr. 22, 2009] http://www.wirelessdevnet.com/news/2001/155/news5.html; 2 pages.

Xia, F., et al., "Home Agent Initiated Flow Binding for Mobile IPv6," Network Working Group, Oct. 19, 2009, 15 pages; http://tools.ietf.orghtml/draft-xia-mext-ha-init-flow-binding-01.txt.

Xin, Jun, et al., "Efficient macroblock coding-mode decision for H.264/AVC video coding," Technical Repot MERL 2004-079, Mitsubishi Electric Research Laboratories, Jan. 2004; www.merl.com/publications/TR2004-079/; 12 pages.

Yang, Jie, et al., "A Real-Time Face Tracker," Proceedings 3rd IEEE Workshop on Applications of Computer Vision; 1996; Dec. 2-4, 1996; pp. 142-147; http://www.ri.cmu.edu/pub_files/pub1/yang_iie_1996_1/yang_iie_1996_1.pdf.

Yang, Ming-Hsuan, et al., "Detecting Faces in Images: A Survey," vol. 24, No. 1; Jan. 2002; pp. 34-58; http://vision.ai.uiuc.edu/mhyang/papers/pami02a.pdf.

Yang, Ruigang, et al., "Real-Time Consensus-Based Scene Reconstruction using Commodity Graphics Hardware," Department of Computer Science, University of North Carolina at Chapel Hill; 2002; http://www.cs.unc.edu/Research/stc/publications/yang_pacigra2002.pdf; 10 pgs.

Yang, Xiaokang, et al., Rate Control for H.264 with Two-Step Quantization Parameter Determination but Single-Pass Encoding, EURASIP Journal on Applied Signal Processing, Jun. 2006; http://downloads.hindawi.com/journals/asp/2006/063409.pdf; 13 pages.

Yegani, P. et al., "GRE Key Extension for Mobile IPv4," Network Working Group, Feb. 2006, 11 pages; http://tools.ietf.org/pdf/draft-yegani-gre-key-extension-01.pdf.

Yoo, Byounghun, et al., "Image-Based Modeling of Urban Buildings Using Aerial Photographs and Digital Maps," Transactions in GIS, 2006, 10(3): p. 377-394.

Zhong, Ren, et al., "Integration of Mobile IP and MPLS," Network Working Group, Jul. 2000, 15 pages; http://tools.ietf.org/html/draft-zhong-mobile-ip-mpls-01.

"Oblong Industries is the developer of the g-speak spatial operation environment," Oblong Industries Information Page, 2 pages, [Retrieved and printed on Dec. 1, 2010].

Underkoffler, John, "G-Speak Overview 1828121108," video clip, Vimeo.com, 1 page, [Retrieved and printed on Dec. 1, 2010] http://vimeo.com/2229299.

Kramer, Kwindla, "Mary Ann de Lares Norris at Thinking Digital," Oblong Industries, Inc. Web Log, Aug. 24, 2010; 1 page; http://oblong.com/articles/OBS6hEeJmoHoCwgJ.html.

"Mary Ann de Lares Norris," video clip, Thinking Digital 2010 Day Two, Thinking Digital Videos, May 27, 2010, 3 pages; http://videos.thinkingdigital.co.uk/2010/05/mary-ann-de-lares-norris-oblong/.

Kramer, Kwindla, "Oblong at TED," Oblong Industries, Inc. Web Log, Jun. 6, 2010, 1 page; http://oblong.com/article/0822LFIS1NVyrOmR.html.

"John Underkoffler points to the future of UI," video clip and interactive transcript, Video on TED.com, Jun. 2010, 6 pages; http://www.ted.com/talks/john_underkoffler_drive_3d_data_with_a_gesture.html.

Kramer, Kwindla, "Oblong on Bloomberg TV," Oblong Industries, Inc. Web Log, Jan. 28, 2010, 1 page; http://oblong.com/article/0AN_1KD9q990PEnw.html.

Kramer, Kwindla, "g-speak at RISD, Fall 2009," Oblong Industries, Inc. Web Log, Oct. 29, 2009, 1 page; http://oblong.com/article/09uW060q6xRIZYvm.html.

Kramer, Kwindla, "g-speak + TMG," Oblong Industries, Inc. Web Log, Mar. 24, 2009, 1 page; http://oblong.com/article/08mM77zpYMm7kFtv.html.

"g-stalt version 1," video clip, YouTube.com, posted by ziggles on Mar. 15, 2009, 1 page; http://youtube.com/watch?v=k8ZAql4mdvk.

Underkoffler, John, "Carlton Sparrell speaks at MIT," Oblong Industries, Inc. Web Log, Oct. 30, 2009, 1 page; http://oblong.com/article/09usAB411Ukb6CPw.html.

Underkoffler, John, "Carlton Sparrell at MIT Media Lab," video clip, Vimeo.com, 1 page, [Retrieved and printed Dec. 1, 2010] http://vimeo.com/7355992.

Underkoffler, John, "Oblong at Altitude: Sundance 2009," Oblong Industries, Inc. Web Log, Jan. 20, 2009, 1 page; http://oblong.com/article/08Sr62ron_2akg0D.html.

Underkoffler, John, "Oblong's tamper system 1801011309," video clip, Vimeo.com, 1 page, [Retrieved and printed Dec. 1, 2010] http://vimeo.com/2821182.

Feld, Brad, "Science Fact," Oblong Industries, Inc. Web Log, Nov. 13, 2008, 2 pages,http://oblong.com/article/084H-PKI5Tb914Ti.html.

Kwindla Kramer, "g-speak in slices," Oblong Industries, Inc. Web Log, Nov. 13, 2008, 6 pages; http://oblong.com/article/0866JqfNrFg1NeuK.html.

Underkoffler, John, "Origins: arriving here," Oblong Industries, Inc. Web Log, Nov. 13, 2008, 5 pages; http://oblong.com/article/085zBpRSY9JeLv2z.html.

Rishel, Christian, "Commercial overview: Platform and Products," Oblong Industries, Inc., Nov. 13, 2008, 3 pages; http://oblong.com/article/086E19gPvDcktAf9.html.

\* cited by examiner

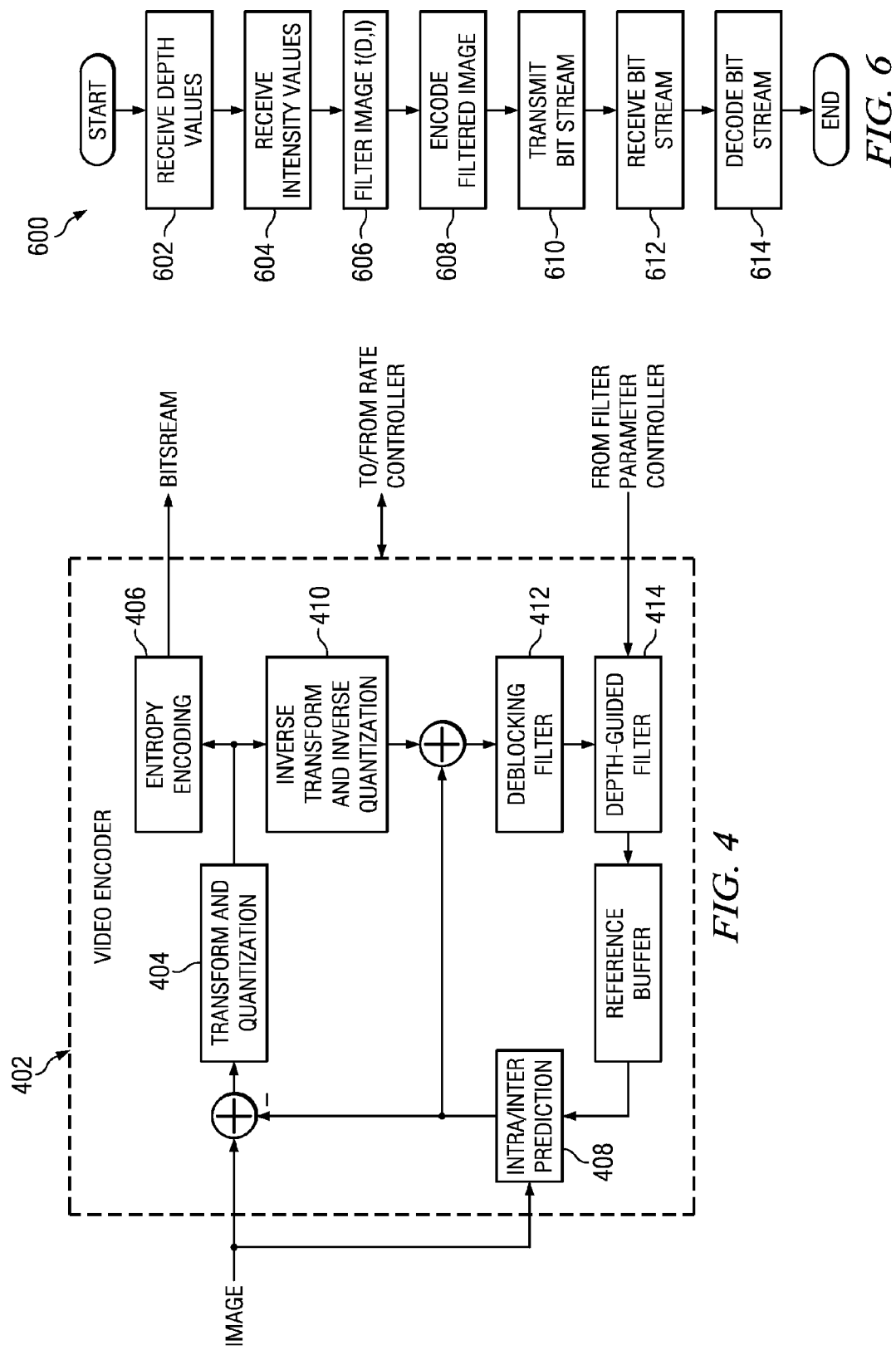

SYSTEM AND METHOD FOR DEPTH-GUIDED IMAGE FILTERING IN A VIDEO CONFERENCE ENVIRONMENT

TECHNICAL FIELD

This disclosure relates in general to the field of communications, and more particularly, to a system and a method for depth-guided image filtering in a video conference environment.

BACKGROUND

Video architectures have grown in complexity in recent times. Some video architectures can deliver real-time, face-to-face interactions between people using advanced visual, audio, and collaboration technologies. In certain architectures, service providers may offer sophisticated video conferencing services for their end users, which can simulate an "in-person" meeting experience over a network. The ability to optimize video encoding and decoding with certain bitrate constraints during a video conference presents a significant challenge to developers and designers, who attempt to offer a video conferencing solution that is realistic and that mimics a real-life meeting.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 4 is a simplified block diagram illustrating additional details that may be associated with another embodiment of a video encoder in which a depth-guided filter is an in-loop filter;

FIG. 6 is a simplified flowchart illustrating one possible set of activities associated with the present disclosure.

DETAILED DESCRIPTION OF EXAMPLE EMBODIMENTS

Overview

A method is provided in one example embodiment that includes receiving a plurality of depth values corresponding to pixels of an image. The method also includes filtering (e.g., adjusting, modifying, improving) the image as a function of a plurality of variations (e.g., differences) in the depth values between adjacent pixels of a window associated with the image. In more detailed embodiments, the method may include encoding the image into a bit stream for transmission over a network. The filtering can account for a bit rate associated with the encoding of the image.

In other embodiments, the method includes receiving intensity values corresponding to the pixels, where the filtering is a function of variations in the intensity values between the adjacent pixels. The filtering of the image can include smoothing certain adjacent pixels having variations of depth values below a threshold value. The image is filtered in a loop comprising an inverse transform, an inverse quantization, and a prediction compensation that is based on previous encoding. The window may include pixels from a spatial region, or a temporal region. The filtering can preserve pixels corresponding to depth values closer to a viewpoint over pixels corresponding to depth values further away from the viewpoint.

Example Embodiments

Figure 1:
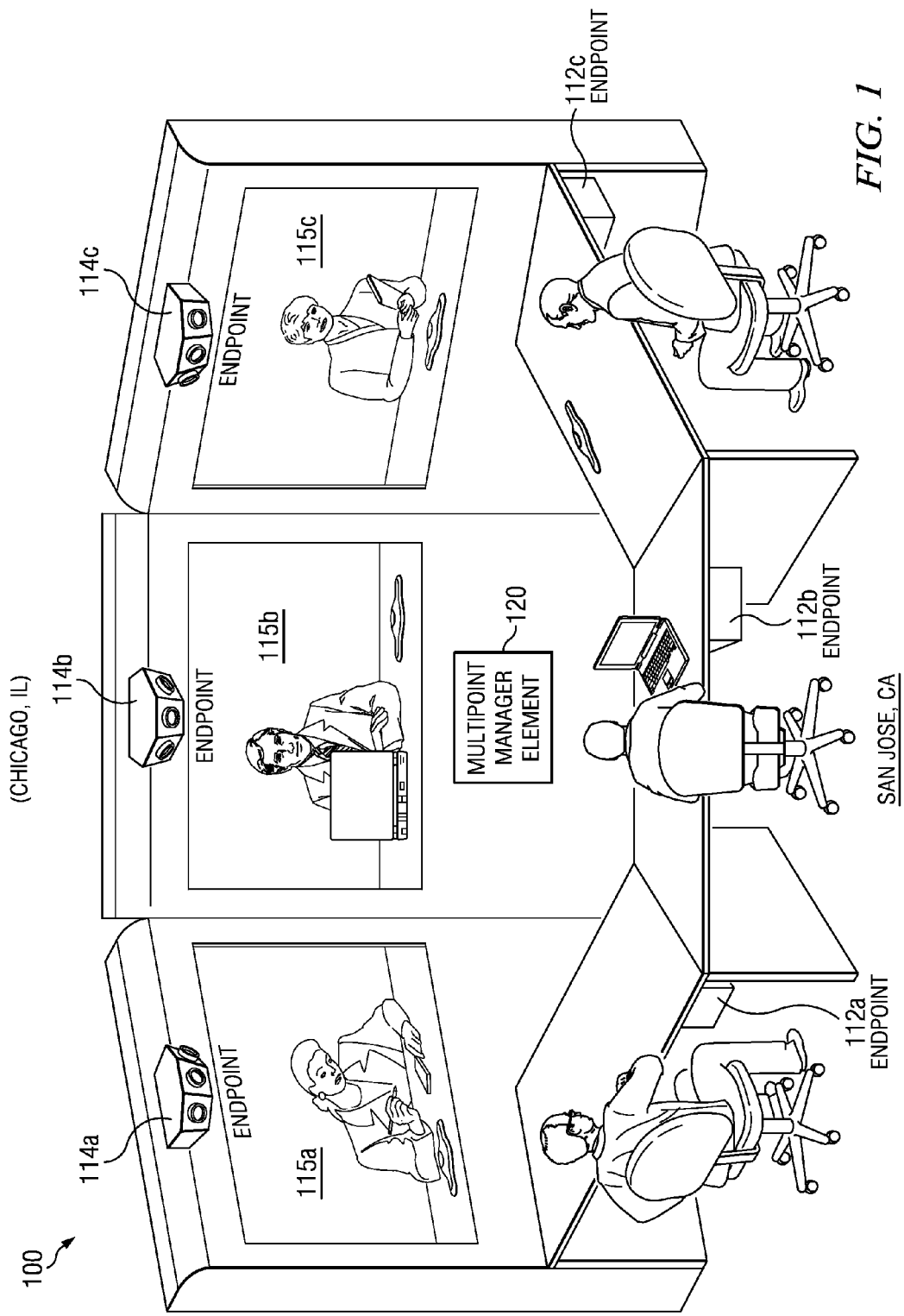
FIG. 1 is a simplified block diagram illustrating an example embodiment of a communication system in accordance this disclosure.

Turning to FIG. 1, FIG. 1 is a simplified schematic diagram illustrating a communication system 100 for conducting a video conference in accordance with one embodiment of the present disclosure. FIG. 1 includes multiple endpoints associated with various end users of the video conference. In general, endpoints may be geographically separated, wherein this particular example, a plurality of endpoints 112a-112c are located in San Jose, Calif. and remote endpoints (not shown) are located in Chicago, Ill. FIG. 1 includes a multipoint manager element 120 coupled to endpoints 112a-112c. Note that the numerical and letter designations assigned to the endpoints do not connote any type of hierarchy; the designations are arbitrary and have been used for purposes of teaching only. These designations should not be construed in any way to limit their capabilities, functionalities, or applications in the potential environments that may benefit from the features of communication system 100.

In this example, each endpoint 112a-112c is fitted discreetly along a desk and is proximate to its associated participant. Such endpoints could be provided in any other suitable location, as FIG. 1 only offers one of a multitude of possible implementations for the concepts presented herein. In one example implementation, the endpoints are videoconferencing endpoints, which can assist in receiving and communicating video and audio data. Other types of endpoints are certainly within the broad scope of the outlined concepts, and some of these example endpoints are further described below. Each endpoint 112a-112c is configured to interface with a respective multipoint manager element 120, which helps to coordinate and to process information being transmitted by the end users.

As illustrated in FIG. 1, a number of image capture devices 114a-114c and displays 115a-115c are provided to interface with endpoints 112a-112c, respectively. Displays 115a-115c render images to be seen by conference participants and, in this particular example, reflect a three-display design (e.g., a 'triple'). Note that as used herein in this specification, the term "display" is meant to connote any element that is capable of rendering an image during a video conference. This would necessarily be inclusive of any panel, screen, Telepresence display or wall, computer display, plasma element, television, monitor, or any other suitable surface or element that is capable of such rendering.

The components of communication system 100 may use specialized applications and hardware to create a system that can leverage a network. Communication system 100 can use standard IP technology and can operate on an integrated voice, video, and data network. The system can also support high quality, real-time voice, and video communications using broadband connections. It can further offer capabilities for ensuring quality of service (QoS), security, reliability, and high availability for high-bandwidth applications such as video. Power and Ethernet connections for all end users can be provided. Participants can use their laptops to access data for the meeting, join a meeting place protocol or a Web session, or stay connected to other applications throughout the meeting.

For purposes of illustrating certain example techniques of communication system 100, it is important to understand certain image processing techniques and the communications that may be traversing the network. The following foundational information may be viewed as a basis from which the present disclosure may be properly explained.

Conceptually, an image may be described as any electronic element (e.g., an artifact) that reproduces the form of a subject, such as an object or a scene. In many contexts, an image may be an optically formed duplicate or reproduction of a subject, such as a two-dimensional photograph of an object or scene. In a broader sense, an image may also include any two-dimensional representation of information, such as a drawing, painting, or map. A video is a sequence of images, in which each still image is generally referred to as a "frame."

A digital image, in general terms, is a numeric representation of an image. A digital image is most commonly represented as a set (rows and columns) of binary values, in which each binary value is a picture element (i.e., a "pixel"). A pixel holds quantized values that represent the intensity (or "brightness") of a given color at any specific point in the two-dimensional space of the image. A digital image can be classified generally according to the number and nature of those values (samples), such as binary, grayscale, or color. Typically, pixels are stored in a computer memory as a two-dimensional array of small integers (i.e., a raster image or a raster map).

An image (or video) may be captured by optical devices having a sensor that converts lights into electrical charges, such as a digital camera or a scanner, for example. The electrical charges can then be converted into digital values. Some digital cameras give access to almost all the data captured by the camera, using a raw image format. An image can also be synthesized from arbitrary non-image information, such as mathematical functions or three-dimensional geometric models.

Images from digital image capture devices often receive further processing to improve their quality and/or to reduce the consumption of resources, such as memory or bandwidth. For example, a digital camera frequently includes a dedicated digital image-processing unit (or chip) to convert the raw data from the image sensor into a color-corrected image in a standard image file format. Image processing in general includes any form of signal processing for which the input is an image, such as a photograph or video frame. The output of image processing may be either an image or a set of characteristics or parameters related to the image. Most image-processing techniques involve treating the image as a two-dimensional signal and applying standard signal-processing techniques to it.

Digital images can be coded (or compressed) to reduce or remove irrelevance and redundancy from the image data to improve storage and/or transmission efficiency. For example, general-purpose compression generally includes entropy encoding to remove statistical redundancy from data. However, entropy encoding is frequently not very effective for image data without an image model that attempts to represent a signal in a form that is more readily compressible. Such models exploit the subjective redundancy of images (and video). A motion model that estimates and compensates for motion can also be included to exploit significant temporal redundancy usually found in video.

An image encoder usually processes image data in blocks of samples. Each block can be transformed (e.g., with a discrete cosine transform) into spatial frequency coefficients. Energy in the transformed image data tends to be concentrated in a few significant coefficients; other coefficients are usually close to zero or insignificant. The transformed image data can be quantized by dividing each coefficient by an integer and discarding the remainder, typically leaving very few non-zero coefficients, which can readily be encoded with an entropy encoder. In video, the amount of data to be coded can be reduced significantly if the previous frame is subtracted from the current frame.

Digital image processing often also includes some form of filtering intended to improve the quality of an image, such as by reducing noise and other unwanted artifacts. Image noise can be generally defined as random variation of brightness or color information in images not present in the object imaged. Image noise is usually an aspect of electronic noise, which can be produced by the sensor and/or other circuitry of a capture device. Image noise can also originate during quantization. In video, noise can also refer to the random dot pattern that is superimposed on the picture as a result of electronic noise. Interference and static are other forms of noise, in the sense that they are unwanted, which can affect transmitted signals.

Smoothing filters attempt to preserve important patterns in an image, while reducing or eliminating noise or other fine-scale structures. Many different algorithms can be implemented in filters to smooth an image. One of the most common algorithms is the "moving average", often used to try to capture important trends in repeated statistical surveys. Noise filters, for example, generally attempt to determine whether the actual differences in pixel values constitute noise or real photographic detail, and average out the former while attempting to preserve the latter. However, there is often a tradeoff made between noise removal and preservation of fine, low-contrast detail that may have characteristics similar to noise. Other filters (e.g., a deblocking filter) can be applied to improve visual quality and prediction performance, such as by smoothing the sharp edges that can form between macroblocks when block-coding techniques are used.

Image textures can also be calculated in image processing to quantify the perceived texture of an image. Image texture data provides information about the spatial arrangement of color or intensities in an image or a selected region of an image. The use of edge detection to determine the number of edge pixels in a specified region helps determine a characteristic of texture complexity. After edges have been found, the direction of the edges can also be applied as a characteristic of texture and can be useful in determining patterns in the texture. These directions can be represented as an average or in a histogram. Image textures may also be useful for classification and segmentation of images. In general, there are two primary types of segmentation based on image texture: region-based and boundary-based. Region-based segmentation generally attempts to group or cluster pixels based on texture properties together, while boundary-based segmentation attempts to group or cluster pixels based on edges between pixels that come from different texture properties. Though image texture is not always a perfect measure for segmentation, it can be used effectively along with other measures, such as color, to facilitate image segmentation.

In 3-D imaging, an image may be accompanied by a depth map that contains information corresponding to a third dimension of the image: indicating distances of objects in the scene to the viewpoint. In this sense, depth is a broad term indicative of any type of measurement within a given image. Each depth value in a depth map can correspond to a pixel in an image, which can be correlated with other image data (e.g., intensity values). Depth maps may be used for virtual view synthesis in 3-D video systems (e.g., 3DTV, or for gesture recognition in human-computer interaction, for example, MICROSOFT KINECT).

From a video coding perspective, depth maps may also be used for segmenting images into multiple regions, usually along large depth discontinuities. Each region may then be encoded separately, with possibly different parameters. Segmenting each image into foreground and background is one example, in which foreground objects in closer proximity to the viewpoint are differentiated from background objects that are relatively far away from the viewpoint. Such segmentation can be especially meaningful for Telepresence and video conferencing, in which scenes comprise primarily meeting participants, i.e., people.

However, merely using depth maps for image segmentation does not fully exploit the information to optimize image coding. In general, pixels within a region have been treated equally after segmentation in coding: regardless of their locations in the region with respect to other regions. In the foreground-background case, for example, a block of pixels in a color image is encoded as either foreground or background, which lacks a fine grain approach for improving image coding using depth.

In accordance with embodiments disclosed herein, communication system 100 can overcome this shortcoming (and others) by providing depth-guided image filtering. More specifically, communication system 100 can provide a system and method for processing a sequence of images using depth maps that are generated in correspondence to the images. Depth maps and texture data of images can be used to develop a filter, which can be applied to the images. Such a system and method may be particularly advantageous for a conferencing environment such as communication system 100, in which images are encoded under a bitrate constraint and transported over a network, but the filter may also be applied advantageously independent of image encoding.

At its most general level, the system and method described herein may include receiving an image and a depth map, such as from a 3-D camera, and filtering the image according to the depth map such that details in the image that correspond to depth discontinuity and intensity variation can be preserved while substantially reducing or eliminating noise in the image. When coupled with a video encoder, the image may be further filtered such that details of objects closer to a viewpoint are preserved preferentially over objects further away, which may be particularly useful when the bitrate for encoding the image is constrained. For a block-based video encoder such as H.264 or MPEG-4, for example, the filtering may operate to reduce coding artifacts, such as artifacts introduced by quantization errors. When coupled with a video encoder, depth-guided filtering may further operate to conceal errors from partial image corruption, such as might occur with data loss during transmission.

Before turning to some of the additional operations of communication system 100, a brief discussion is provided about some of the infrastructure of FIG. 1. Endpoint 112a may be used by someone wishing to participate in a video conference in communication system 100. The term "endpoint" may be inclusive of devices used to initiate a communication, such as a switch, a console, a proprietary endpoint, a telephone, a bridge, a computer, a personal digital assistant (PDA), a laptop or electronic notebook, an iPhone, an iPad, a Google Droid, any other type of smartphone, or any other device, component, element, or object capable of initiating voice, audio, or data exchanges within communication system 100. In some embodiments, image capture devices may be integrated with an endpoint, particularly mobile endpoints.

Endpoint 112a may also be inclusive of a suitable interface to an end user, such as a microphone, a display, or a keyboard or other terminal equipment. Endpoint 112a may also include any device that seeks to initiate a communication on behalf of another entity or element, such as a program, a database, or any other component, device, element, or object capable of initiating a voice or a data exchange within communication system 100. Data, as used herein, refers to any type of video, numeric, voice, or script data, or any type of source or object code, or any other suitable information in any appropriate format that may be communicated from one point to another. Additional details relating to endpoints are provided below with reference to FIG. 2.

In operation, multipoint manager element 120 can be configured to establish, or to foster a video session between one or more end users, which may be located in various other sites and locations. Multipoint manager element 120 can also coordinate and process various policies involving endpoints 112a-112c. In general, multipoint manager element 120 may communicate with endpoints 112a-112c through any standard or proprietary conference control protocol. Multipoint manager element 120 includes a switching component that determines which signals are to be routed to individual endpoints 112a-112c. Multipoint manager element 120 can also determine how individual end users are seen by others involved in the video conference. Furthermore, multipoint manager element 120 can control the timing and coordination of this activity. Multipoint manager element 120 can also include a media layer that can copy information or data, which can be subsequently retransmitted or simply forwarded along to one or more endpoints 112a-112c.

Figure 2A:
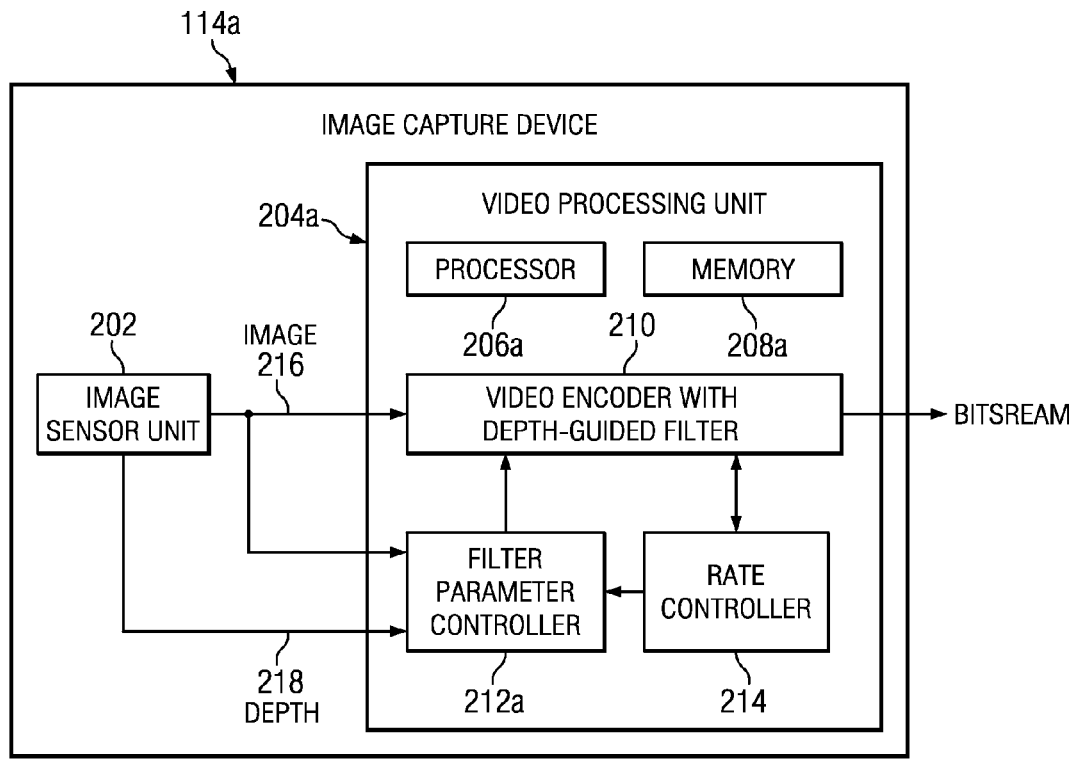
FIG. 2A is a simplified block diagram illustrating additional details that may be associated with a video processing unit in which a depth-guided filter is coupled with a video encoder to encode an image.

FIG. 2A is a simplified block diagram illustrating additional details that may be associated with a video processing unit 204a, in which a depth-guided filter is coupled with a video encoder to encode an image. In this example embodiment, the video processing unit is integrated with image capture device 114a, which can include also an image sensor unit 202. Video processing unit 204a may further include a processor 206a, a memory element 208a, a video encoder 210 with a depth-guided filter, a filter parameter controller 212a, and a rate controller 214. Video processing unit 204a may be associated with a proprietary element, a server, a network appliance, or any other suitable component, device, module, or element capable of performing the operations discussed herein.

Video processing unit 204a can also be configured to store, aggregate, process, export, and/or otherwise maintain image data and logs in any appropriate format, where these activities can involve processor 206a and memory element 208a. Video processing unit 204a is generally configured to receive information as a signal (e.g., an image signal or a video signal) from image sensor unit 202 via some connection. In the example embodiment of FIG. 2A, video processing unit 204a is integrated with image capture device 114a, but it may be implemented independently of video processing unit 204a, or it may be integrated with other components in communication system 100, such as endpoint 112a or multipoint manager element 120.

Video processing unit 204a may interface with image sensor unit 202 through a wireless connection, or via one or more cables or wires that allow for the propagation of signals between these two elements. These devices can also receive signals from an intermediary device, a remote control, etc., where the signals may leverage infrared, Bluetooth, WiFi, electromagnetic waves generally, or any other suitable transmission protocol for communicating data (e.g., potentially over a network) from one element to another. Virtually any control path can be leveraged in order to deliver information between video processing unit 204a and image sensor unit 202. Transmissions between these two sets of devices can be bidirectional in certain embodiments such that the devices can interact with each other (e.g., dynamically, real-time, etc.). This would allow the devices to acknowledge transmissions from each other and offer feedback, where appropriate. Any of these devices can be consolidated with each other, or operate independently based on particular configuration needs. For example, a single box may encompass audio and video reception capabilities (e.g., a set-top box that includes video processing unit 204a, along with camera and microphone components for capturing video and audio data).

In general terms, video processing unit 204a is a video element, which is intended to encompass any suitable unit, module, software, hardware, server, program, application, application program interface (API), proxy, processor, field programmable gate array (FPGA), erasable programmable read only memory (EPROM), electrically erasable programmable ROM (EEPROM), application specific integrated circuit (ASIC), digital signal processor (DSP), or any other suitable device, component, element, or object configured to process video data. This video element may include any suitable hardware, software, components, modules, interfaces, or objects that facilitate the operations thereof. This may be inclusive of appropriate algorithms and communication protocols that allow for the effective exchange (reception and/or transmission) of data or information.

In yet other embodiments, though, video processing unit 204a may be a network element, or may be integrated with a network element. A network element generally encompasses routers, switches, gateways, bridges, load balancers, firewalls, servers, processors, modules, or any other suitable device, component, element, or object operable to exchange information in a network environment. This includes proprietary elements equally, which can be provisioned with particular features to satisfy a unique scenario or a distinct environment.

Video processing unit 204a may share (or coordinate) certain processing operations with other video elements. Memory element 208a may store, maintain, and/or update data in any number of possible manners. In a general sense, the arrangement depicted herein may be more logical in its representations, whereas a physical architecture may include various permutations/combinations/hybrids of these elements.

In one example implementation, video processing unit 204a may include software (e.g., as part of video encoder 210) to achieve certain operations described herein. In other embodiments, operations may be provided externally to any of the aforementioned elements, or included in some other video element or endpoint (either of which may be proprietary) to achieve this intended functionality. Alternatively, several elements may include software (or reciprocating software) that can coordinate in order to achieve the operations, as outlined herein. In still other embodiments, any of the devices illustrated herein may include any suitable algorithms, hardware, software, components, modules, interfaces, or objects that facilitate operations disclosed herein, including depth-guided image filtering.

In the context of a video conference, image sensor unit 202 can capture participants and other scene elements as a sequence of images 216 and depth maps 218. Each image 216 and depth map 218 can be passed as a signal to video encoder 210 in video processing unit 204a. Video encoder 210 includes a depth-guided filter that can be used to filter and encode the signal into a bit stream 220, which can be transmitted to another endpoint in a video conference, for example. Video encoder 210 may operate under rate controller 214 by receiving instructions from rate controller 214 and providing rate controller 214 with rate statistics of the video encoding. Filter parameter controller 212a may also receive instructions from rate controller 214 and determine parameters for the depth-guided filter based on image 216 and depth map 218. The encoded bit stream may include compressed image data, depth values, and/or parameters from filter parameter controller 212a, for example.

Figure 2B:
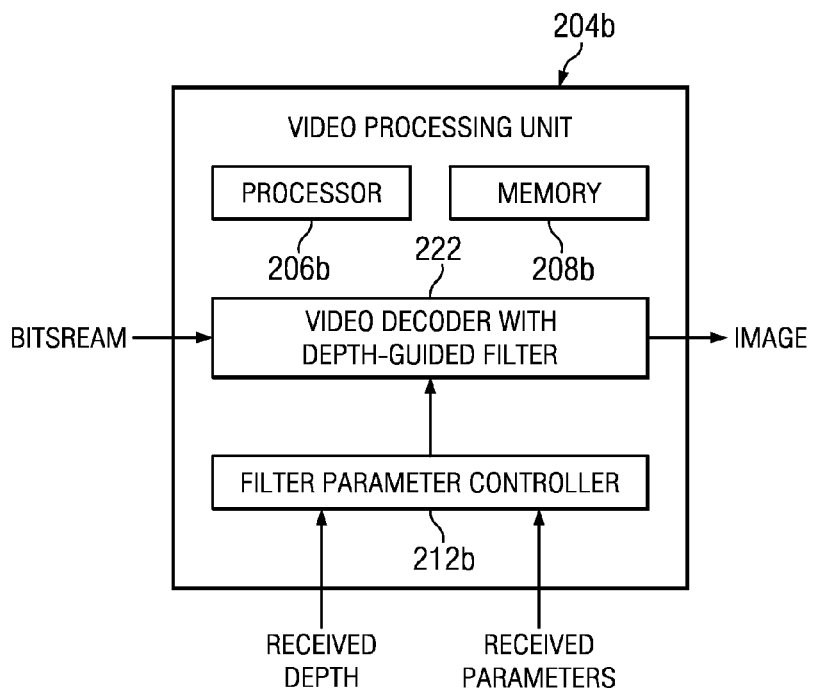
FIG. 2B is a simplified block diagram illustrating additional details that may be associated with a video processing unit in which a depth-guided filter is coupled with a video decoder to decode an image.

FIG. 2B is a simplified block diagram illustrating additional details that may be associated with a video processing unit 204b, in which a depth-guided filter is coupled with a video decoder to decode an image. Video processing unit 204b is similar to video processing unit 204a in that it also includes a respective processor 206b, a memory element 208b, and a filter parameter controller 212b, and may also be configured to store, aggregate, process, export, and/or otherwise maintain image data and logs in any appropriate format, where these activities can involve processor 206b and memory element 208b. It also shares many of the other characteristics of video processing unit 204a, including characteristics of a video element and/or a network element in various embodiments. In some embodiments, elements of video processing unit 204a and video processing unit 204b may be integrated into a single unit. Video processing unit 204b differs from video processing unit 204a to the extent that it includes a video decoder 222 and operates to decode a bit stream into an image that can be rendered on a suitable output device, such as display 115a, based on received depth values and filter parameters. Video processing unit 204b is generally configured to receive information from a bit stream via some connection, which may be a wireless connection, or via one or more cables or wires that allow for the propagation of signals.

Figure 3:
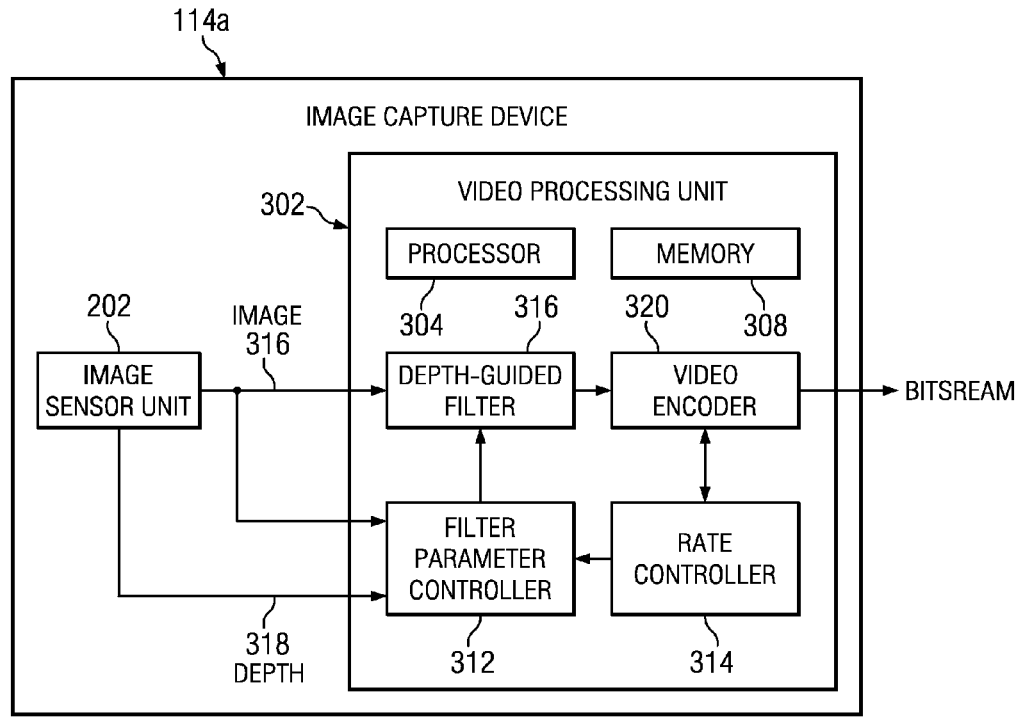
FIG. 3 is a simplified block diagram illustrating additional details that may be associated with another embodiment of a video processing unit, in which a depth-guided filter is coupled with a video decoder as a pre-filter.

FIG. 3 is a simplified block diagram illustrating additional details that may be associated with another embodiment of a video processing unit in which a depth-guided filter is coupled with a video encoder as a pre-filter. In this example embodiment, video processing unit 302 is integrated with image capture device 114a, which includes image sensor 202. Video processing unit 302 may be similar to video processing unit 204a in that it also includes a respective processor 304, a memory element 308, a filter parameter controller 312, and a rate controller 314, and it may also be configured to store, aggregate, process, export, and/or otherwise maintain image data and logs in any appropriate format, where these activities can involve processor 304 and memory element 308. It also shares many of the other characteristics of video processing unit 204a, including characteristics of a video element and/or a network element in various embodiments.

Video processing unit 302 is generally configured to receive information as a signal from image sensor unit 202 via some connection, which may be a wireless connection, or via one or more cables or wires that allow for the propagation of signals. Video processing unit 302 applies depth-guided filtering to an image 316 based on depth map 318 before it is encoded with video encoder 320, such that edges in image 316 that correspond to depth discontinuity and intensity variations can be preserved while noises in image 316 are removed or reduced.

FIG. 4 is a simplified block diagram illustrating additional details that may be associated with another embodiment of a video encoder, in which a depth-guided filter is an in-loop filter. A video encoder 402 is generally configured to receive image information as a signal via some connection, which may be a wireless connection, or via one or more cables or wires that allow for the propagation of signals. In the example embodiment of video encoder 402, an image can be processed in blocks or macroblocks of samples. In general, a video encoder can transform each block into a block of spatial frequency coefficients, divide each coefficient by an integer, and discard the remainder, such as in a transform and quantization module 404. The resulting coefficients can then be encoded, for example, with entropy encoding module 406.

Prediction (intra/inter prediction module 408) may also be used to enhance encoding, such as with motion compensation. A prediction can be formed based on previously encoded data, either from the current time frame (intra-prediction) or from other frames that have already been coded (inter-prediction). For example, inverse transform and inverse quantization 410 can be used to rescale the quantized transform coefficients. Each coefficient can be multiplied by an integer value to restore its original scale. An inverse transform can combine the standard basis patterns, weighted by the rescaled coefficients, to re-create each block of data. These blocks can be combined together to form a macroblock, and the prediction can be subtracted from the current macroblock to form a residual.

In a video encoder with an in-loop filter, such as video encoder 402, a deblocking filter 412 can also be applied to blocks in decoded video to improve visual quality and prediction performance by smoothing the sharp edges that can form between macroblocks when block-coding techniques are used. In video encoder 402, a depth-guided filter 414 can be applied to an image after inverse transform and inverse quantization, deblocking filtering, and prediction compensation. By fusing depth information with texture data, the depth-guided filtering can help reduce coding artifacts, such as those that can be introduced by quantization errors.

Figure 5:
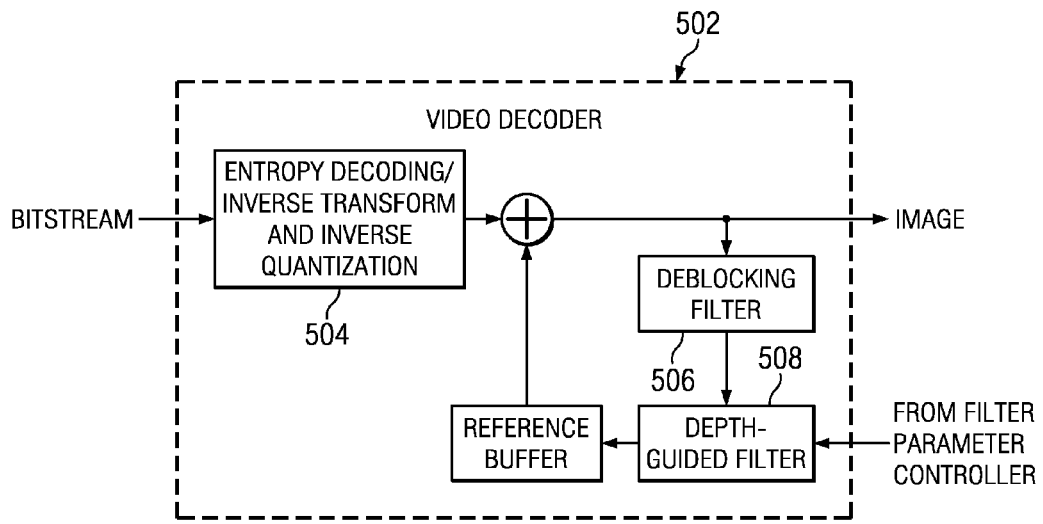
FIG. 5 is a simplified block diagram illustrating additional details that may be associated with another embodiment of a video decoder in which a depth-guided filter is an in-loop filter.

FIG. 5 is a simplified block diagram illustrating additional details that may be associated with another embodiment of a video decoder, in which a depth-guided filter is an in-loop filter. A video decoder 502 is generally configured to receive information from a bit stream via some connection. Entropy decoding, inverse transform, and inverse quantization 504 can be used to decode and rescale quantized transform coefficients from the bit stream. Each coefficient can be multiplied by an integer value to restore its original scale. An inverse transform can combine the standard basis patterns, weighted by the rescaled coefficients, to re-create each block of data. These blocks can be combined together to form a macroblock. In a video decoder with an in-loop filter, such as video decoder 502, a deblocking filter 506 can also be applied to decoded blocks to improve visual quality and prediction performance by smoothing the sharp edges that can form between macroblocks when block-coding techniques are used. In video decoder 502, a depth-guided filter 508 can be applied after deblocking filter 506. Depth-guided filter 508 may also be advantageous for concealing errors if part of an image is corrupted, such as during transmission data loss.

One example form of a depth-guided filter may be defined as:

$$DGF(p) = \frac{1}{W_p} \sum_{q \in S} G_{\sigma_d}(|D_p - D_q|) \cdot G_{\sigma_r}(|I_p - I_q|) \cdot I_q$$

In the equation, p is the center pixel to be filtered, and q is a neighboring pixel in the window S. $D_p$, $I_p$, and $D_q$, $I_q$ denote the depth and intensity values of the two pixels, respectively; $G_{\sigma_d}$ and $G_{\sigma_r}$ are two zero-mean Gaussian distributions with standard deviations $\sigma_d$ and $\sigma_r$, which control the strength of Gaussian smoothing according to depth and texture, respectively; and $W_p$ is a normalization factor:

$$W_p = \sum_{q \in S} G_{\sigma_d}(|D_p - D_q|) \cdot G_{\sigma_r}(|I_p - I_q|)$$

In general, a filter window comprises a finite group of pixels around a pixel to be filtered (the "center" pixel). The window is typically symmetric about the center pixel, but may also be asymmetrical in some embodiments. The window can be square (e.g., 3×3, 5×5, etc.), but can also be circular or other shapes. The window S may include pixels from a spatial or temporal region (e.g., a neighborhood) or both. In this example embodiment of a depth-guided filter, all pixels are given the same weight regardless of their spatial or temporal distance to the center pixel p, but in other embodiments different weights can be assigned to neighboring pixels in accordance to their distance to the center pixel. Such different weights may also follow a Gaussian distribution with respect to the distance of the pixels. Alternatively, other distributions such as the Gibbs distribution (also known as the Gibbs measure) or user-defined piece-wise linear/non-linear functions may be used instead of the Gaussian distribution.

A depth-guided filter as described herein may be applied to remove spatial and temporal noise that is coherent from the production of images (e.g., from the video camera, and to reduce coding errors such as quantization errors). By taking into account both depth and texture variations, the filtering operations can be performed such that pixels with small depth and intensity variations (therefore, likely to be noise) will be smoothed, whereas those with large depth or intensity variations can be preserved. As a result, details corresponding to contour and texture-rich areas in the image may be perceptually enhanced.

The strength of the smoothing effect of each Gaussian can be controlled by the standard deviation (i.e., σ). The strength is directly proportional to the size of the standard deviation. Consequently, fewer details may be preserved after filtering. In a video encoding context, this means that there may be less information to be encoded. Therefore, by adjusting the sigma $\sigma_d$ according to the depth of pixels, one may preferably preserve more details for objects that are closer to the viewpoint and less for objects that are farther away. When operating under a bit-rate controller, the adjustment may also account for the bit rate that is available for encoding the current image.

When included in a video decoding loop, the depth-guided filter may also operate to conceal decoding errors that may be caused by, for example, loss of image data during transmission over a network, assuming that the corresponding depth data was correctly received. For example, the error concealment process may include first copying image data from previously decoded images from multiple locations, selecting the one that has strong edges best aligned with discontinuities in the received depth map, and applying the depth-guided filter to the image formed by the preceding step.

FIG. 6 is a simplified flowchart 600 illustrating potential operations that may be associated with example embodiments of a video encoder and/or decoder according to this disclosure. At 602, depth values corresponding to pixels of an image may be received. At 604, intensity values corresponding to the pixels may also be received. At 606, the image can be filtered as a function of variations in depth and intensity values between adjacent pixels of a window. For example, the filtering may include smoothing adjacent pixels having variations of depth values below a configurable threshold value. In general, the filtering can preserve pixels corresponding to depth values closer to a viewpoint (preferentially) over pixels corresponding to depth values further away from the viewpoint. At 608, the image can be encoded into a bit stream for transmission (e.g., over a network interface).

At 610, the encoded bit stream may be transmitted, along with depth information and other codec parameters, which may be received at 612. At 614, the depth information and other codec parameters may be used to decode the bit stream into an image. Note that such depth-guided filtering may provide significant advantages, some of which have already been discussed. In particular, a depth map can be used to improve image quality, by reducing noise and coding errors, for example. Depth-guided filtering may also provide a fine granular control of image details.

In certain example implementations, the image processing functions outlined herein may be implemented by logic encoded in one or more tangible media (e.g., embedded logic provided in an application specific integrated circuit (ASIC), digital signal processor (DSP) instructions, software (potentially inclusive of object code and source code) to be executed by a processor, or other similar machine, etc.). In some of these instances, a memory element (as shown in FIG. 2A and FIG. 2B) can store data used for the operations described herein. This includes the memory element being able to store software, logic, code, or processor instructions that are executed to carry out the activities described herein. A processor can execute any type of instructions associated with the data to achieve the operations detailed herein. In one example, a processor (e.g., as shown in FIG. 2A and FIG. 2B) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable ROM (EEPROM)) or an ASIC that includes digital logic, software, code, electronic instructions, or any suitable combination thereof.

In certain implementations, a video processing unit (or other elements of communication system 100) can include software in order to achieve the depth-guided image filtering outlined herein. For example, at least some portions of the activities outlined herein may be implemented in non-transitory logic (i.e., software) provisioned in, for example, video processing units 204a-204b, multipoint manager element 120, and/or any of endpoints 112a-112c. Such a configuration can include one or more instances of video encoder with depth-guided filter 210/video decoder with depth-guided filter 222 being provisioned in various locations of the network. In some embodiments, one or more of these features may be implemented in hardware, provided external to the aforementioned elements, or consolidated in any appropriate manner to achieve the intended functionalities. Moreover, the aforementioned elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, components of communication system 100 described and shown herein may also include suitable interfaces for receiving, transmitting, and/or otherwise communicating data or information in a network environment. Additionally, some of the processors and memories associated with the various components may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

The elements discussed herein may be configured to keep information in any suitable memory element (random access memory (RAM), ROM, EPROM, EEPROM, ASIC, etc.), software, hardware, or in any other suitable component, device, element, or object where appropriate and based on particular needs. Any of the memory items discussed herein (e.g., database, table, cache, key, etc.) should be construed as being encompassed within the broad term "memory element." Similarly, any of the potential processing elements, modules, and machines described herein should be construed as being encompassed within the broad term "processor."

Note that with the examples provided above, interaction may be described in terms of two, three, or four elements or components. However, this has been done for purposes of clarity and example only. In certain cases, it may be easier to describe one or more of the functions or operations by only referencing a limited number of components. It should be appreciated that the principles described herein are readily scalable and can accommodate a large number of components, as well as more complicated/sophisticated arrangements and configurations. Accordingly, the examples provided should not limit the scope or inhibit the broad teachings provided herein as potentially applied to a myriad of other architectures. Additionally, although described with reference to particular scenarios, where a particular module is provided within an element, these modules can be provided externally, or consolidated and/or combined in any suitable fashion. In certain instances, such modules may be provided in a single proprietary unit.

It is also important to note that operations in the appended diagrams illustrate only some of the possible scenarios and patterns that may be executed by, or within elements of communication system 100. Some of these operations may be deleted or removed where appropriate, or these operations may be modified or changed considerably without departing from the scope of teachings provided herein. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided in that any suitable arrangements, chronologies, configurations, and timing mechanisms may be provided without departing from the teachings provided herein.

Although a system and method for depth-guided image filtering has been described in detail with reference to particular embodiments, it should be understood that various other changes, substitutions, and alterations may be made hereto without departing from the spirit and scope of this disclosure. For example, although the previous discussions have focused on video conferencing associated with particular types of endpoints, handheld devices that employ video applications could readily adopt the teachings of the present disclosure. For example, iPhones, iPads, Android devices, personal computing applications (i.e., desktop video solutions, Skype, etc.) can readily adopt and use the depth-guided filtering operations detailed above. Any communication system or device that encodes video data would be amenable to the features discussed herein.

It is also imperative to note that the systems and methods described herein can be used in any type of imaging or video application. This can include standard video rate transmissions, adaptive bit rate (ABR), variable bit rate (VBR), CBR, or any other imaging technology in which image encoding can be utilized. Numerous other changes, substitutions, variations, alterations, and modifications may be ascertained to one skilled in the art and it is intended that the present disclosure encompass all such changes, substitutions, variations, alterations, and modifications as falling within the scope of the appended claims.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   receiving, at a video processing unit having a processor, a plurality of depth values corresponding to pixels of an image; and
   filtering, at the video processing unit, the image as a function of a plurality of variations in the depth values between adjacent pixels of a window associated with the image.

2. The method of claim 1, further comprising:
   encoding the image into a bit stream for transmission over a network, wherein the filtering includes accounting for a bit rate associated with the encoding of the image.

3. The method of claim 1, further comprising:
   receiving intensity values corresponding to the pixels, wherein the filtering is a function of variations in the intensity values between the adjacent pixels.

4. The method of claim 1, wherein filtering the image comprises smoothing certain adjacent pixels having variations of depth values below a threshold value.

5. The method of claim 1, wherein the image is filtered in a loop comprising an inverse transform, an inverse quantization, and a prediction compensation that is based on previous encoding.

6. The method of claim 1, wherein the window comprises pixels from a spatial region.

7. The method of claim 1, wherein the window comprises pixels from a temporal region.

8. The method of claim 1, wherein the filtering preserves pixels corresponding to depth values closer to a viewpoint over pixels corresponding to depth values further away from the viewpoint.

9. Logic encoded in one or more non-transitory media that includes code for execution and when executed by one or more processors is operable to perform operations comprising:
   receiving a plurality of depth values corresponding to pixels of an image; and
   filtering the image as a function of a plurality of variations in the depth values between adjacent pixels of a window associated with the image.

10. The logic of claim 9, the operations further comprising:
    encoding the image into a bit stream for transmission over a network, wherein the filtering includes accounting for a bit rate associated with the encoding of the image.

11. The logic of claim 9, the operations further comprising:
    receiving intensity values corresponding to the pixels, wherein the filtering is a function of variations in the intensity values between the adjacent pixels.

12. The logic of claim 9, wherein filtering the image comprises smoothing certain adjacent pixels having variations of depth values below a threshold value.

13. The logic of claim 9, wherein the image is filtered in a loop comprising an inverse transform, an inverse quantization, and a prediction compensation that is based on previous encoding.

14. The logic of claim 9, wherein the window comprises pixels from a spatial region.

15. The logic of claim 9, wherein the window comprises pixels from a temporal region.

16. The logic of claim 9, wherein the filtering preserves pixels corresponding to depth values closer to a viewpoint over pixels corresponding to depth values further away from the viewpoint.

17. An apparatus, comprising:
    one or more processors;
    a memory; and
    a video encoder with a depth-guided filter, wherein the apparatus is configured for:
      receiving a plurality of depth values corresponding to pixels of an image; and
      filtering the image as a function of a plurality of variations in the depth values between adjacent pixels of a window associated with the image.

18. The apparatus of claim 17, the apparatus being further configured for:
    encoding the image into a bit stream for transmission over a network, wherein the filtering includes accounting for a bit rate associated with the encoding of the image.

19. The apparatus of claim 17, the apparatus being further configured for:
    receiving intensity values corresponding to the pixels, wherein the filtering is a function of variations in the intensity values between the adjacent pixels.

20. The apparatus of claim 17, wherein the filtering is configured to preserve pixels corresponding to depth values closer to a viewpoint over pixels corresponding to depth values further away from the viewpoint.

* * * * *